(12) United States Patent
Ono et al.

(10) Patent No.: US 7,882,141 B2
(45) Date of Patent: Feb. 1, 2011

(54) DIGITAL PICTORIAL BOOK SYTSTEM, PICTORIAL BOOK SEARCHING METHOD, AND MACHINE READABLE MEDIUM STORING THEREON PICTORIAL BOOK SEARCHING METHOD

(75) Inventors: Shuji Ono, Kanagawa (JP); Hiroyuki Funakura, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1750 days.

(21) Appl. No.: 11/060,769

(22) Filed: Feb. 18, 2005

(65) Prior Publication Data

US 2005/0185844 A1 Aug. 25, 2005

(30) Foreign Application Priority Data

Feb. 20, 2004 (JP) ............................. 2004-044298
Dec. 22, 2004 (JP) ............................. 2004-372355

(51) Int. Cl.
G06F 17/30 (2006.01)
G06F 7/00 (2006.01)
(52) U.S. Cl. .................................................. 707/802
(58) Field of Classification Search .............. 707/104.1, 707/769, 802
See application file for complete search history.

(56) References Cited

U.S. PATENT DOCUMENTS

| 5,454,043 | A | 9/1995 | Freeman |
| 6,256,033 | B1 | 7/2001 | Nguyen |
| 6,535,250 | B1 * | 3/2003 | Okisu et al. .................. 348/345 |
| 7,151,568 | B2 * | 12/2006 | Kawachi et al. ............. 348/302 |
| 2002/0113973 | A1 * | 8/2002 | Ge .............................. 356/510 |
| 2002/0184196 | A1 * | 12/2002 | Lehmeier et al. ............... 707/3 |
| 2004/0008906 | A1 | 1/2004 | Webb |

FOREIGN PATENT DOCUMENTS

| JP | 08-096132 | 4/1996 |
| JP | 09-298710 | 11/1997 |
| JP | 10-254901 A | 9/1998 |
| JP | 2003-219239 A | 7/2003 |
| WO | WO-01/24050 A1 | 5/2001 |

OTHER PUBLICATIONS

Pentland et al., International Journal of Computer Vision, vol. 18, No. 3, pp. 233-254, 1996, XP 000620218.

* cited by examiner

*Primary Examiner*—Kuen S Lu
(74) *Attorney, Agent, or Firm*—Birch, Stewart, Kolasch & Birch, LLP

(57) ABSTRACT

A digital pictorial book system includes an image capturing module for capturing an image; a main object selecting module for selecting a main object out of the image; an inclination measuring module for measuring inclination of the image capturing module in a vertical direction; and a name searching module for searching for a name of the main object in an image database, which stores a name of an object corresponded to a feature of the object, on the basis of the main object selected by the main object selecting module and the inclination measured by the inclination measuring module.

8 Claims, 22 Drawing Sheets

| 1 | 2 | 2 | 2 | 2 | 1 |
|---|---|---|---|---|---|
| 2 | 2 | 3 | 3 | 2 | 2 |
| 2 | 3 | 4 | 4 | 3 | 2 |
| 2 | 3 | 4 | 4 | 3 | 2 |
| 2 | 2 | 3 | 3 | 2 | 2 |
| 1 | 2 | 2 | 2 | 2 | 1 |

| NAME | FEATURE A | FEATURE B | ... |
|---|---|---|---|
| PARROT FISH | $P_1$, 600, $V_1$ | $P_3$, $V_3$ | ... |
| RED SEABREAM | $P_2$, $V_2$ | $P_4$, $V_4$ | ... |
| ⋮ | ⋮ | ⋮ | ⋱ |
*FIG. 16A*
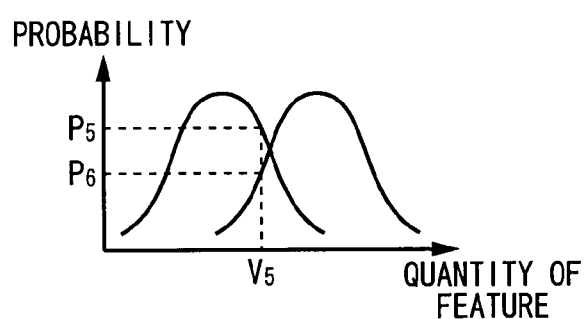
*FIG. 16B*
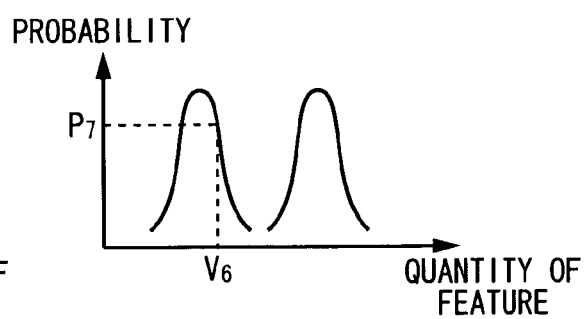
*FIG. 16C*

| NAME | 3-DIMENSIONAL INFORMATION | MOVING DIRECTION |
|---|---|---|
| ⋮ | ⋮ | ⋮ |
| PARROT FISH | 420 | 422 |
| ⋮ | ⋮ | ⋮ |

FIG. 20

DIGITAL PICTORIAL BOOK SYTSTEM, PICTORIAL BOOK SEARCHING METHOD, AND MACHINE READABLE MEDIUM STORING THEREON PICTORIAL BOOK SEARCHING METHOD

This patent application claims priority from a Japanese patent application Nos. 2004-44298 filed on Feb. 20, 2004, and 2004-372355 filed on Dec. 22, 2004, the contents of which are incorporated herein by reference.

BACKGROUND OF THE INVENTION

1. Field of the Invention

The present invention relates to a digital pictorial book system, a pictorial book searching method, and a machine readable medium storing there on a pictorial book searching program. More particularly, the present invention relates to a digital pictorial book system, a pictorial book searching method, and a machine readable medium storing thereon a pictorial book searching program for searching for and providing a user with a name of an object of which an image is captured.

2. Description of the Related Art

Recently, it is highly demanded to identify species of animals and plants discovered during diving, trekking, and the like, then and there. In response to this demand, a digital pictorial book system is known which searches for a name of an object in an image database on the basis of an image of the object captured by a digital camera, and provides a user with the name (for example, see Japanese Patent Application Laid-Open No. 1998-254901).

According to the conventional digital pictorial book system, for example, the name of the object is searched out in an image database by comparing a digitized image of the object with a digitized image of each item stored in the image database.

However, since a fish is always swimming, it is very difficult to capture an image of the fish at a desired angle, for example, when the fish crosses a camera horizontally. Further, during diving, a fish passes over or below a diver sometimes. Thus, there are many variations in the camera angle at which an image of a fish is captured during diving.

Therefore, in case searching for a name of an object, for example, by comparing digitized images by using an image of a fish captured during diving, it is difficult to acquire a search result of good accuracy. Further, there is also this kind of problem in case capturing an image of mobile living things other than fishes. However, the conventional digital pictorial book system does not provide a method for acquiring the search result of good accuracy in this case.

SUMMARY OF THE INVENTION

Therefore, it is an object of the present invention to provide a digital pictorial book system, a pictorial book searching method, and a machine readable medium storing thereon a pictorial book searching program, which are capable of overcome the above drawbacks. The above and other objects can be achieved by combinations described in the independent claims. The dependent claims define further advantageous and exemplary combinations of the present invention.

According to the first aspect of the present invention, a digital pictorial book system includes an image capturing module for capturing an image; a main object selecting module for selecting a main object out of the image; an inclination measuring module for measuring inclination of the image capturing module in a vertical direction; and a name searching module for searching for a name of the main object in an image database, which stores a name of an object corresponded to a feature of the object, on the basis of the main object selected by the main object selecting module and the inclination measured by the inclination measuring module.

The image database may store the image of the object as three-dimensional information, and the name searching module may search for the name of the main object in the image database by using the inclination as an image capturing direction with respect to the main object. The digital pictorial book system may further include a vertical direction image adjusting module for adjusting the image of the main object to be an image captured in a horizontal direction by using the inclination measured by the inclination measuring module, and the name searching module may search for the name of the main object by using the image adjusted by the vertical direction image adjusting module. The digital pictorial book system may further include a vertical direction image adjusting module for adjusting the image of the main object to be an image captured in a vertical direction by using the inclination measured by the inclination measuring module, and the name searching module may search for the name of the main object by using the image adjusted by the vertical direction image adjusting module.

The digital pictorial book system may include a first feature extracting module for extracting a feature of the main object from the image adjusted by the vertical direction adjusting module; a degree of similarity acquiring module for acquiring degree of similarity between the main object and each of a plurality of objects of which name is stored in the image data base by comparing the feature of the main object extracted by the first feature extracting module with that of each of the plurality of objects stored in the image database; and a name selecting module for selecting the name of the main object out of names of the plurality of objects on the basis of the acquired degree of similarity of each of the plurality of objects.

The name selecting module may select a name of an object or names of objects of a predetermined number having the highest degree of similarity or degrees of similarities out of the names of the plurality of objects, and the digital pictorial book system may further include a displaying module for displaying the name selected by the name selecting module. The name searching module may further include a distinguishing feature selecting module for selecting a distinguishing feature, which has the least overlap in a certainty distribution of the feature for every name and every kind of feature of the object out of different kinds of features which are stored in the image database and corresponded to each of the plurality of names, in case the name selecting module selects a plurality of names, and the displaying module may further display information on the distinguishing feature. The name selecting module may inform a user of impossibility of searching for the name of the main object in case the acquired degree of similarity is lower than a predetermined reference value for each of the plurality of objects.

The name searching module may further include a second feature extracting module for extracting a feature of an object different from that of the main object out of the image adjusted by the vertical direction adjusting module, the image database may store the name of the object further corresponded to a feature of a thing of high relevance to the object, and the degree of similarity acquiring module may acquire the degree of similarity between the main object and each of the plurality of objects by further comparing the feature of the thing of high relevance to the object stored in the image database with the feature of the object different from the main object extracted by the second feature extracting module for each of the plurality of objects of which the name is stored in the image database.

The name searching module may further include an annexed information acquiring module for acquiring information annexed to the image, the image database may store the name of the object further corresponded to the annexed information annexed to the image of the object, and the degree of similarity acquiring module may acquire the degree of similarity between the main object and each of the plurality of objects by comparing the annexed information annexed to the image of the object stored in the image database with the annexed information acquired by the annexed information acquiring module for each of the plurality of objects of which the names are stored in the image database.

The image capturing module may capture a moving picture, the image database may store the name of the object corresponded to a movement information on a movement of the object, the name searching module may include: a motion detecting module for detecting a movement of the main object on the basis of each of the main objects of a plurality of frames of the moving picture; a degree of similarity acquiring module for acquiring a degree of similarity between the main object and each of the plurality of objects by comparing the movement shown by the movement information of the object stored in the image database with that of the main object detected by the motion detecting module for each of the plurality of objects of which names are stored in the image database; and a name selecting module for selecting the name of the main object out of names of the plurality of objects on the basis of the acquired degree of similarity of each of the plurality of objects. The name searching module may further include a featuring point detecting module for detecting a featuring point of the main object of each of the plurality of frame images, and the motion detecting module may detect the motion of the main object on the basis of a variation in the featuring point detected by the featuring point detecting module for each of the plurality of frame images.

According to the second aspect of the present invention, a digital pictorial book system includes an image capturing module for capturing images successively; a main object selecting module for selecting a main object out of each of the successively captured images; a moving direction acquiring module for acquiring a moving direction of the main object on the basis of variations of a size of the main object in each of the successively captured images and a position of the main object within a range of image capturing angle of the image capturing module; and a name searching module for searching for a name of the main object in an image database, which stores a name of an object corresponded to a feature of the object, on the basis of the main object selected by the main object selecting module and the moving direction.

The digital pictorial book system may further include an image capturing direction variation acquiring module for acquiring a variation in the image capturing direction of the image capturing module, and the moving direction acquiring module may acquire the moving direction of the main object further on the basis of the variation in the image capturing direction acquired by the image capturing direction variation acquiring module. The image database may store the image of the object as three-dimensional information, and the name searching module may search for the name of the main object in the image database by using a projected image of the object projected on a plane orthogonal to the image capturing direction, the projected image being generated on the basis of the moving direction and the three-dimensional information.

The digital pictorial book system may further include a moving direction image adjusting module for adjusting the image of the main object on the basis of the moving direction of the main image acquired by the moving direction acquiring module, and the name searching module may search for the name of the main object in the image database by using the image adjusted by the moving direction image adjusting module. The moving direction image adjusting module may adjust the image of the main object by expanding the main image to a direction of a projected vector, which is provided by projecting a vector of the moving direction on a plane orthogonal to the image capturing direction, at the same rate as needed to expand the projected vector to have the length of the vector of the moving direction. The digital pictorial book system may further include an image database. The digital pictorial book system may further include a pressure-resistant and water-proof case for protecting the image capturing module from high pressure and water.

According to the third aspect of the present invention, a digital pictorial book searching method using an image capturing module includes an image capturing step of capturing an image; a main object selecting step of selecting a main image out of the image; an inclination measuring step of measuring an inclination of the image capturing module in a vertical direction; and a name searching step of searching for a name of the main object in an image database, which stores a name of an object corresponded to a feature of the object, on the basis of the main object selected by the main object selecting module and the inclination measured in the inclination measuring step.

According to the fourth aspect of the present invention, a digital pictorial book searching method using an image capturing module includes an image capturing step of capturing images successively; a main object selecting step of selecting a main object out of each of the successively captured images; a moving direction acquiring step of acquiring a moving direction of the main object on the basis of variations of a size of the main object in each of the successively captured images and a position of the main object within a range of image capturing angle of the image capturing module; and a name searching step of searching for a name of the main object in an image database, which stores a name of an object corresponded to a feature of the object, on the basis of the main object selected by the main object selecting module and the moving direction by the inclination measuring module.

According to the fifth aspect of the present invention, a machine readable medium storing thereon a program making a computer function as a digital pictorial book system is provided, wherein the digital pictorial book system includes an image capturing module for capturing an image; a main object selecting module for selecting a main object out of the image; an inclination measuring module for measuring inclination of the image capturing module in a vertical direction; a name searching module for searching for a name of the main object in an image database, which stores a name of an object corresponded to a feature of the object, on the basis of the main object selected by the main object selecting module and the inclination measured by the inclination measuring module.

According to the sixth aspect of the present invention, a machine readable medium storing thereon a program making a computer function as a digital pictorial book system is provided, wherein the digital pictorial book system includes an image capturing module for capturing images successively; a main object selecting module for selecting a main object out of each of the successively captured images; a moving direction acquiring module for acquiring a moving direction of the main object on the basis of variations of a size of the main object in each of the successively captured images and a position of the main object within a range of image capturing angle of the image capturing module; and a name searching module for searching for a name of the main object in an image database, which stores a name of an object corresponded to a feature of the object, on the basis of the main object selected by the main object selecting module and the moving direction by the inclination measuring module.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 16 shows an example of the process by a distinguishing feature selecting module 570 according to the present embodiment.

FIG. 20 shows an example of the image database 38 according to a modification of the present embodiment.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
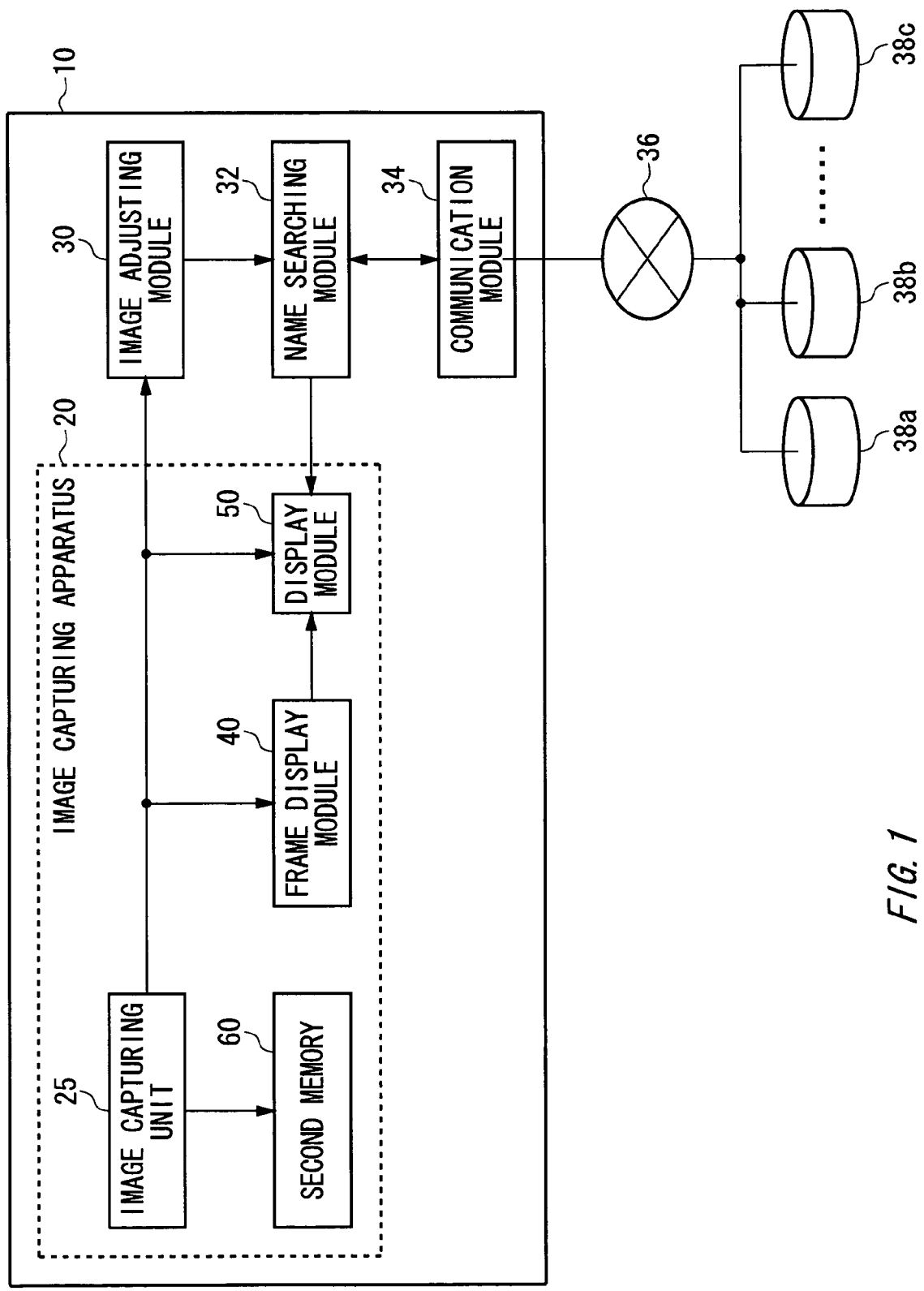
FIG. 1 is a block diagram exemplary showing a configuration of a digital pictorial book system 10 according to an embodiment of the present invention.

FIG. 1 is a block diagram exemplary showing a configuration of a digital pictorial book system 10 according to an embodiment of the present invention. The digital pictorial book system 10 captures an image of an object, searches for the name of the object on the basis of the captured image, and provides the name a user. For example, in case the user is trekking or diving, the digital pictorial book system 10 captures an image of an animal or a plant found by the user, searches for information such as a name and comments on the biology of the animal or the plant, and provides the user with the information.

It is an object of the digital pictorial book system 10 according to the embodiment of the present invention to search for a name of an object accurately in case of capturing images of the object from various directions.

The digital pictorial book system 10 includes an image capturing apparatus 20, an image adjusting module 30, a name searching module 32, and a communication module 34. The digital pictorial book system 10 connects with the network 36 by the communication module 34, and searches for a name of the object in image databases (38a, 38b, ..., 38c; hereinafter, referred to as 38), which store a name of an object corresponded to a feature of the object, through the network 36. The communication module 34 connects with the network 36, such as the Internet, by a wired communication such as Ethernet® or a wireless communication such as LAN, Bluetooth®, and CDMA.

The image capturing apparatus 20 includes an image capturing unit 25, a display module 50, a frame display module 40, and a second memory. The image capturing apparatus 20 may be a digital still camera for capturing a still image or a digital video camera for capturing a moving picture. The image capturing unit 25 captures an image of an object, selects a main object out of the image, and out puts the image of the object and information showing the selected main object to the image adjusting module 30, the frame display module 40, and the display module 50. The display module 50 is, for example, an LCD monitor, and displays the image of the object captured by the image capturing unit 25 and a name and an explanation of the object searched out on the basis of the captured image. The frame display module 40 displays a frame surrounding, for example, the main object, etc., on the display module 50 so that the frame is superimposed on the captured image. The second memory 60 is, for example, a non-volatile memory such as a flash memory and stores the image captured by the image capturing unit 25.

The image adjusting module 30 adjusts the image received from the image capturing unit 25 base on an image capturing direction of the image capturing unit 25 and a moving direction of the main object acquired from the captured image. Then, the image adjusting module 30 outputs the adjusted image to the name searching module 32. The name searching module 32 extracts a feature of the main object of the image received from the image adjusting module 30. Here, the feature of the main object is, for example, a contour shape, a digitized image, a color distribution, and the like, which are extracted from the image of the main object by an image processing technique. Then, the name searching module 32 transmits the feature extracted from the image of the main object to the image database 38 through the communication module 34, searched for an object having a feature, which is the same as or similar to the feature extracted from the main object, out of objects stored in the image database 38, and receives the search result through the communication module 34. Then, the name searching module 32 makes the search result displayed on the display module 50 and thus provides the user with the name and the explanation of the main object.

Further, the configuration shown in the present figure is an example and many modifications can be made to the configuration. For example, although the name searching module 32 shown in the present figure accesses to the image database 38 formed outside the digital pictorial book system 10 through the communication module 34 and the network 36, the name searching module 32 may access to the image database 38 formed inside the digital pictorial book system 10. Thus, the digital pictorial book system 10 can search for the name of the main object even under a condition that it is impossible to communicate with the outside.

Furthermore, the digital pictorial book system 10 may be controlled to choose which one to use of the outside image database 38 and the inside image database 38. For example, if communication with the outside is impossible, the digital pictorial book system 10 may use the image database 38 formed inside, otherwise, use the image databases 38 formed outside. Furthermore, the digital pictorial book system 10 may use both the outside image database 38 and the inside image database 38 at the same time. As described above, it is possible to search for an explanation of the main object efficiently and improve convenience by changing flexibly the configuration of the image database 38 to be used according to purposes and conditions of utilization.

Figure 2:
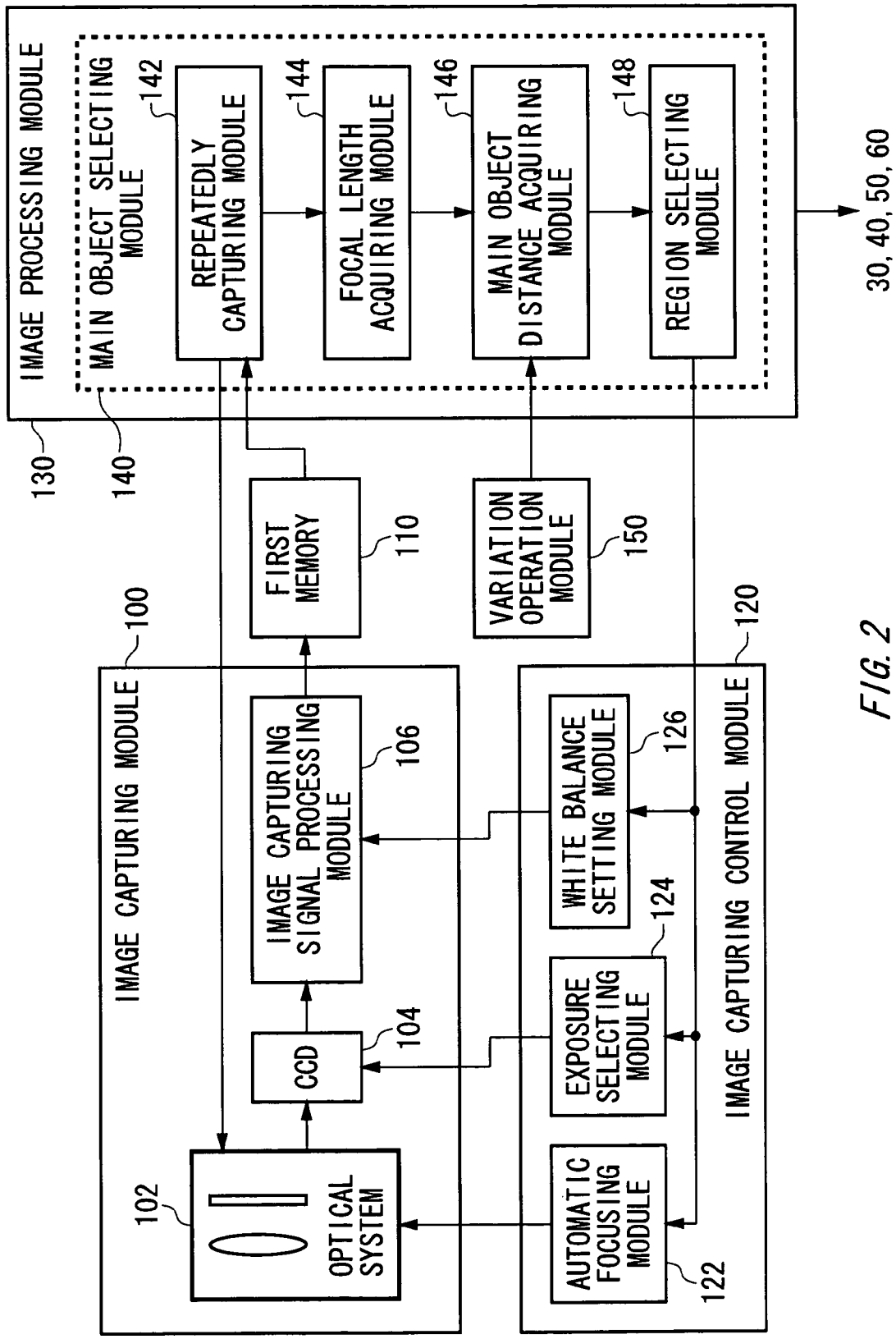
FIG. 2 is a block diagram exemplary showing a configuration of an image capturing unit 25 according to the present embodiment.

FIG. 2 is a block diagram exemplary showing a configuration of the image capturing unit 25 according to the present embodiment. The image capturing unit 25 includes an image capturing module 100, a first memory 110, an image capturing control module 120, an image processing module 130, and a variation operation module 150.

The image capturing apparatus 20 according to the present embodiment recognizes a main object from the image captured by the image capturing module 100. It is an object of the image capturing apparatus 20 to capture an image of good quality, which the user desires to obtain, easily by controlling the image processing based on the image of the recognized main object and displaying the recognized main object, which is surrounded by a frame, to deliver to the user.

Further, it is an object of the image capturing apparatus 20 according to the present embodiment to execute search of high accuracy efficiently by recognizing the main object, of which name is searched out by the name searching module 32, automatically and correctly.

The image capturing module includes an optical system 102, a CCD 104, and an image capturing signal processing module 106, and captures an image of an object. The optical system 102 includes, for example, a focus lens, a zoom lens, and the like, and forms an image of the object on a light receiving surface of the CCD 104. Further, the optical system 102 can vary a focal length which is a distance from the image capturing apparatus 20 to the focused object by, for example, moving the focus lens. The CCD 104 includes a plurality of light receiving elements and outputs electric charges, which are accumulated on each of the light receiving elements due to the object's optical image formed on the light receiving surface by the optical system 102, as a voltage signal to the image capturing signal processing module 106. Further, the CCD 104 can control a degree of exposure by controlling the time taken for the electric charges to be accumulated on each of the light receiving elements.

The image capturing signal processing module 106 decomposes the analog voltage signal, which shows the object and is received from the CCD 104, into R, G, and B components. Then, the image capturing signal processing module 106 regulates a white balance of the object by regulating each of the R, G, and B components. Further, the image capturing signal processing module 106 may execute a process such as the gamma correction. Then, the image capturing signal processing module 106 converts the analog signal decomposed into the R, G, and B components into a digital signal and outputs the acquired digital image data showing the object to the first memory 110. The first memory 110 is, for example, a volatile memory such as a DRAM and stores the digital image data output from the image capturing signal processing module 106.

The image capturing control module 120 controls the image showing the object by driving a mechanical element included in the image capturing module 100. The image capturing control module 120 includes an automatic focusing module 122, an exposure selecting module 124, and a white balance setting module 126. The automatic focusing module 122 controls the focal length of the optical system 102. For example, the automatic focusing module 122 controls the focal length of the optical system 102 by driving the focus lens using a stepping motor.

The exposure selecting module 124 controls the degree to which the object is exposed for the image capturing module 100. Specifically, the exposure selecting module 124 controls the degree of exposure by controlling the time taken for electric charges to be accumulated on the light receiving elements included in the CCD 104. Instead, the selecting module 124 may control the degree of exposure by controlling a mechanical shutter included in the image capturing module 100, which is not shown. The white balance setting module 126 sets a white balance of the image showing the object for the image capturing module. Specifically, the white balance setting module 126 sets the white balance by controlling the regulating process of the R, G, and B components for the image capturing signal processing module 106.

Further, the image capturing control module 120 may control zoom and stop operations of the image capturing module 100.

The image processing module 130 processes the digital image data stored in the first memory 110 by the image capturing signal processing module 106 and outputs the processed result to the display module 50 and the second memory 60. Here, the image data process is, for example, a data compression process such as an YC converting process, JPEG (Joint Photographic Coding Experts Group), etc., and a process of converting to video signal such as NTSC, PAL, etc. Further, the image processing module 130 includes a main object selecting module 140.

The main object selecting module 140 selects a main object out of the image captured by the image capturing module 100 and received from the image capturing signal processing module 106. The main object selecting module 140 includes a repeatedly capturing module 142, a focal length acquiring module 144, a main object distance acquiring module 146, and a region selecting module 148. The repeatedly capturing module 142 make images captured while varying the focal length by the optical system 102, receives the captured images from the image capturing signal processing module 106, and outputs the received images to the focal length acquiring module 144. The focal length acquiring module 144 acquires a focal length at which an image can be acquired, each of the regions included in the image being best focused, on the basis of the images captured by the repeatedly capturing module 142, and outputs the acquired result to the main object distance acquiring module 146.

The main object distance acquiring module 146 acquires a main object distance, which is a distance to the main object, based on the focal length for each region acquired by the focal length acquiring module 144, and outputs the acquired result to the region selecting module 148. The region selecting module 148 selects a region apart by the main object distance received from the main object distance acquiring module 146 out of the captured image as the main object. Then, the region selecting module 148 outputs information on the selected region to the frame display module 40, the automatic focusing module 122, the exposure selecting module 124, the white balance setting module 126, and the image adjusting module 30.

The frame display module 40 shown in FIG. 1 displays a frame surrounding the main object selected by the main object selecting module 140 on the display module 50 so that the frame is superimposed on the image captured by the image capturing module 100. Specifically, the frame display module 40 displays the frame surrounding the region selected by the region selecting module 148 on the display module 50. The variation operation module 150 varies the main object distance output from the main object distance acquiring module 146 on the basis of the operation by a user of the image capturing apparatus 20.

According to the image capturing apparatus 20 of the present embodiment, it is possible to automatically recognize the main object from the image captured by the image capturing module 100. Further, it is possible to easily inform the user of the result of the recognition by displaying the frame surrounding the recognized main object.

Figure 3:
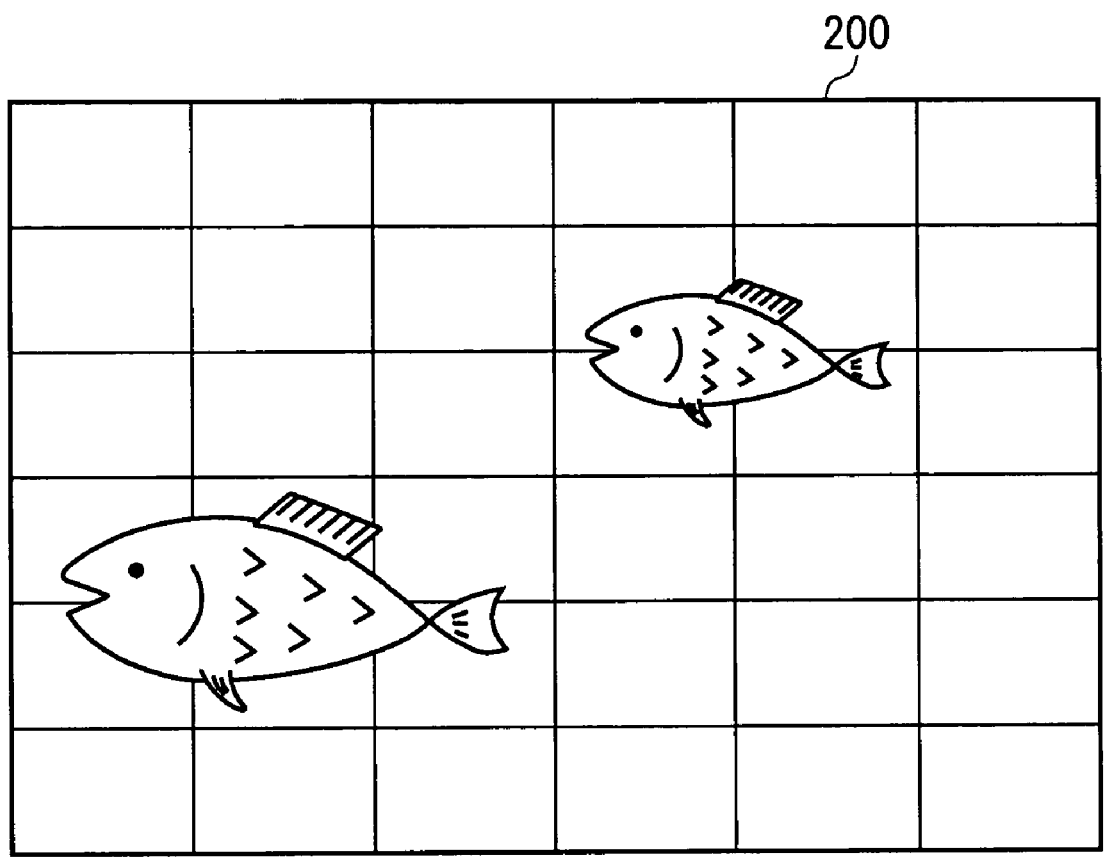
FIG. 3 shows an example of the process by a focal length acquiring module 144 according to the present embodiment.

FIG. 3 shows an example of the process by the focal length acquiring module 144 according to the present embodiment. The focal length acquiring module 144 divides the image captured by the image capturing module 100 into a plurality of regions. For example, the focal length acquiring module 144 divides a captured image 200 into six rectangles in the horizontal direction and into six rectangles in the vertical direction. Alternatively, the focal length acquiring module 144 may divide the captured image 200 into a plurality of regions having different shapes and areas from each other. In this case, the focal length acquiring module 144 can acquire the focal length with high accuracy while suppressing a load required by the process, for example, by dividing the captured image 200 into smaller regions near the center in which the probability of the main object's existing is high, in comparison with dividing the entire of the captured image 200 into small regions uniformly.

The focal length acquiring module 144 detects a degree of focusing of a partial image which is each of the plurality of divided regions. For example, the focal length acquiring module 144 decomposes an image signal of each region into a plurality of frequency components by fast Fourier transformation (FFT) and the like, and detects the level of a high frequency component of the region as a degree of focusing. Then, the focal length acquiring module 144 detects an image having the highest degree of focusing at the region out of the images captured for the plurality of focal lengths by the repeatedly capturing module 142 and acquires the distance at which the image is captured as the focal length of the region.

According to the image capturing apparatus 20 of the present embodiment, it is possible to acquire a focal length for each region of a captured image with high accuracy.

Figures 4A, 4B:
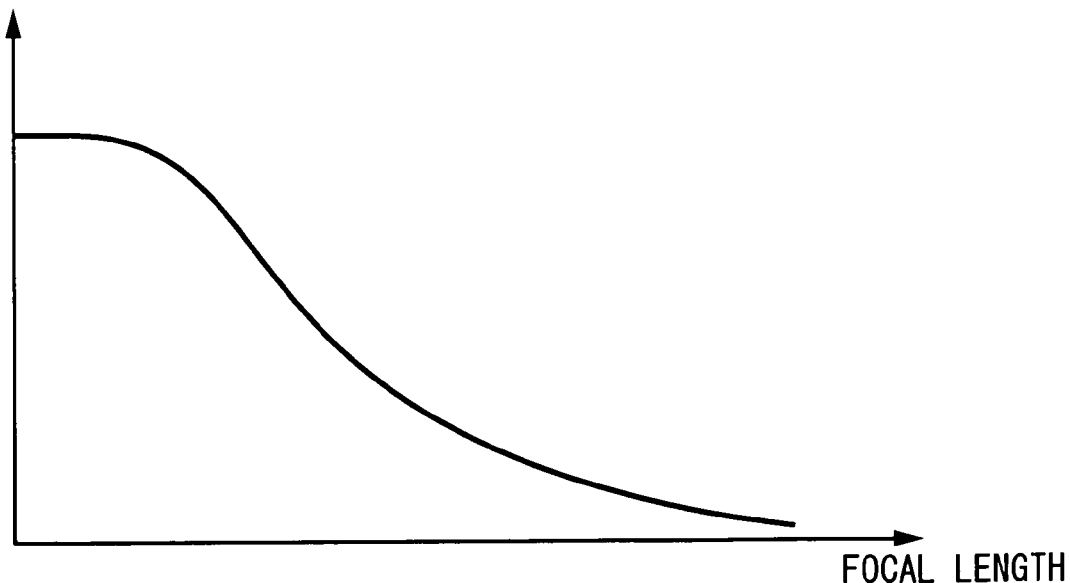
FIG. 4 shows an example of weight used by a main object distance acquiring module 146 according to the present embodiment.

FIG. 4 shows an example of weight used by the main object distance acquiring module 146 according to the present embodiment. FIG. 4A shows an example of weight predetermined for each region of an image captured by the image capturing module 100. The main object distance acquiring module 146 acquires the sum-of-product of the area of the regions having the same focal lengths and the predetermined weight of each region. Specifically, the main object distance acquiring module 146 detects a plurality of regions having the same focal lengths as an object existing at the focal length on the basis of the focal length of each region acquired by the focal length acquiring module 144. Then, for each of the plurality of regions, the main object distance acquiring module 146 acquires a product of the area of the region and the predetermined weight of the region, for example, shown in FIG. 4A. Then, the main object distance acquiring module 146 acquires the sum of the products acquired for the plurality of regions as weight of the object existing at the focal length.

In FIG. 4A, weight of each region at the central portion of an image is higher than that of each region on the edge of the image. That is because a composition of putting a main object at the central portion of an image is widely used. The weight is shown in the present figure as an example and not limited to the description on the present figure. For example, the weight is not constant generally and may vary according to image capturing conditions. Specifically, in case an image capturing mode of the image capturing apparatus 20 is a portrait mode, weight at the central portion of the image may be larger than that of FIG. 4A.

FIG. 4B shows an example of the relationship between the distance weight and the focal length of an image captured by the image capturing module 100. The main object distance acquiring module 146 acquires a value of the sum of the weight at the plurality of regions having the same focal lengths acquired beforehand multiplied by the distance weight to the focal length, which is, for example, obtained from FIG. 4B. Then, the main object distance acquiring module 146 acquires a focal length, at which the acquired value is the largest, as the main object distance.

According to FIG. 4B, the distance weight becomes smaller as the focal length becomes larger. That is because the main object is generally put nearer to the image capturing apparatus 20. The distance weight is shown in the present figure as an example and not limited to the description on the present figure. For example, the weight is not constant generally and may vary according to image capturing conditions. Specifically, in case the image capturing mode of the image capturing apparatus 20 is a macro mode, a degree of the decrease in the distance weight according to the increase in the focal length may become larger. Further, the distance weight at a typical focal length of any image capturing mode may be the largest.

According to the image capturing apparatus 20 of the present embodiment, it is possible to recognize a main object with high accuracy by acquiring a main object distance making use of weight at each region and each focal length.

Figure 5A:
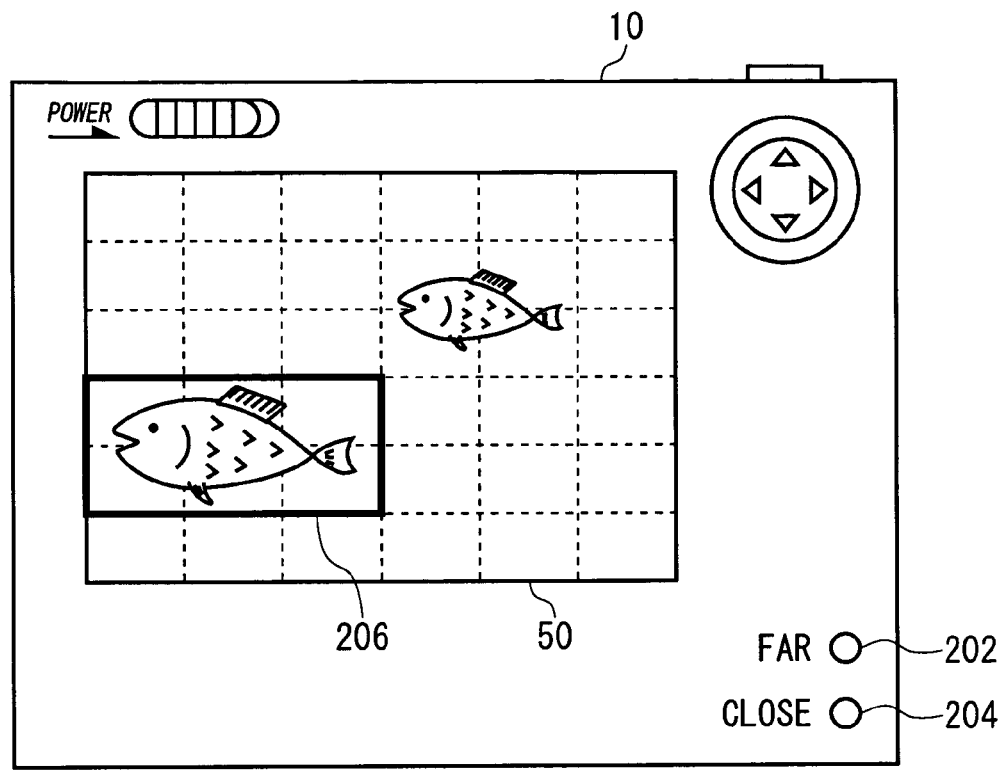
FIG. 5 shows an example of the exterior of the digital pictorial book system 10 according to the present embodiment.

FIG. 5 shows an example of the exterior of the digital pictorial book system 10 according to the present embodiment. FIG. 5A shows an example of the exterior of the digital pictorial book system 10 at a point of time. The pictorial book system 10 shown in FIG. 5A includes a long distance button 202 and a short distance button 204. The long distance button 202 and the short distance button 204 are an example of the variation operation module 150.

The region selecting module 148 selects a region apart by the main object distance acquired by the main object distance acquiring module 146 out of the image captured by the image capturing module 100 as a main object. Then, the frame display unit 40 displays a frame 206 surrounding the region selected by the region selecting module 148 so that the frame 206 is superimposed on the image displayed by the display module 50. Specifically, the frame display module 40 displays the frame 206 in the neighborhood of and around the circumference of the main-object. Here, the neighborhood of the circumference of the main object is not limited to the circumference of the region showing the main object itself. For example, the frame display module 40 may display the frame 206 extended to the outside by a predetermined pixel with respect to the circumference. Thus, it is possible to prevent the main object which is an important region in the captured image from not being seen.

Figure 5B:
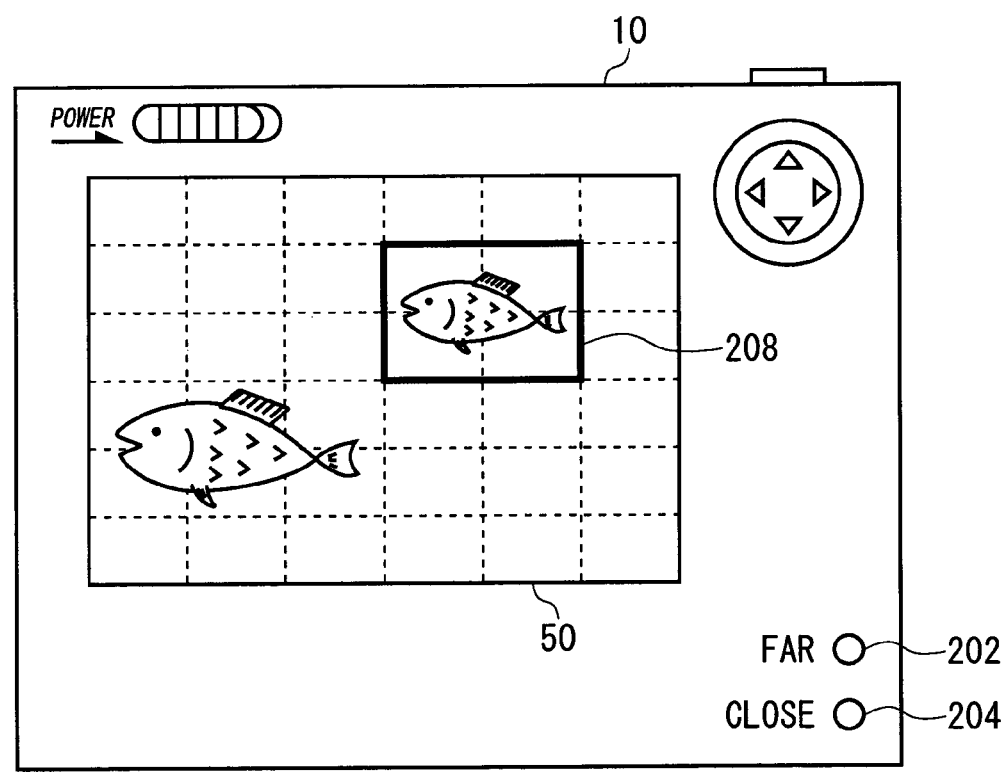

FIG. 5B shows an example of the exterior of the digital pictorial book system 10 in case the user operates the long distance button 202. In case the user pushes the long distance button 202, the long distance button 202 instructs the main object distance acquiring module 146 to vary the main object distance farther. Further, in case the user pushes the close distance button 204, the long distance button 204 instructs the main object distance acquiring module 146 to vary the main object distance more closely.

The main object distance acquiring module 146 receives the instruction, and, out of a plurality of candidates for the main object distance selected on the basis of the weight of the object for each focal length, selects one candidate which is next further or next closer than the main object distance at this point of time as a new main object distance. The main object distance acquiring module 146 outputs the result to the region selecting module 148. Then, the region selecting module 148 selects a region which is apart by the new main object distance as a main object and outputs information showing the region to the frame display module 40. The frame display module 40 receives the information and displays a frame 208 on the display module 50, instead of the frame 206.

According to the image pick apparatus 20 of the present embodiment, even if the automatically recognized main object is not correct, the user can execute image capturing as intended by selecting a correct main object distance.

Further, in case of capturing a moving picture by the image capturing apparatus 20, it is possible to change the main object without changing picture composition while capturing the picture by varying the main object distance by using the variation operation module 150.

Figure 6:
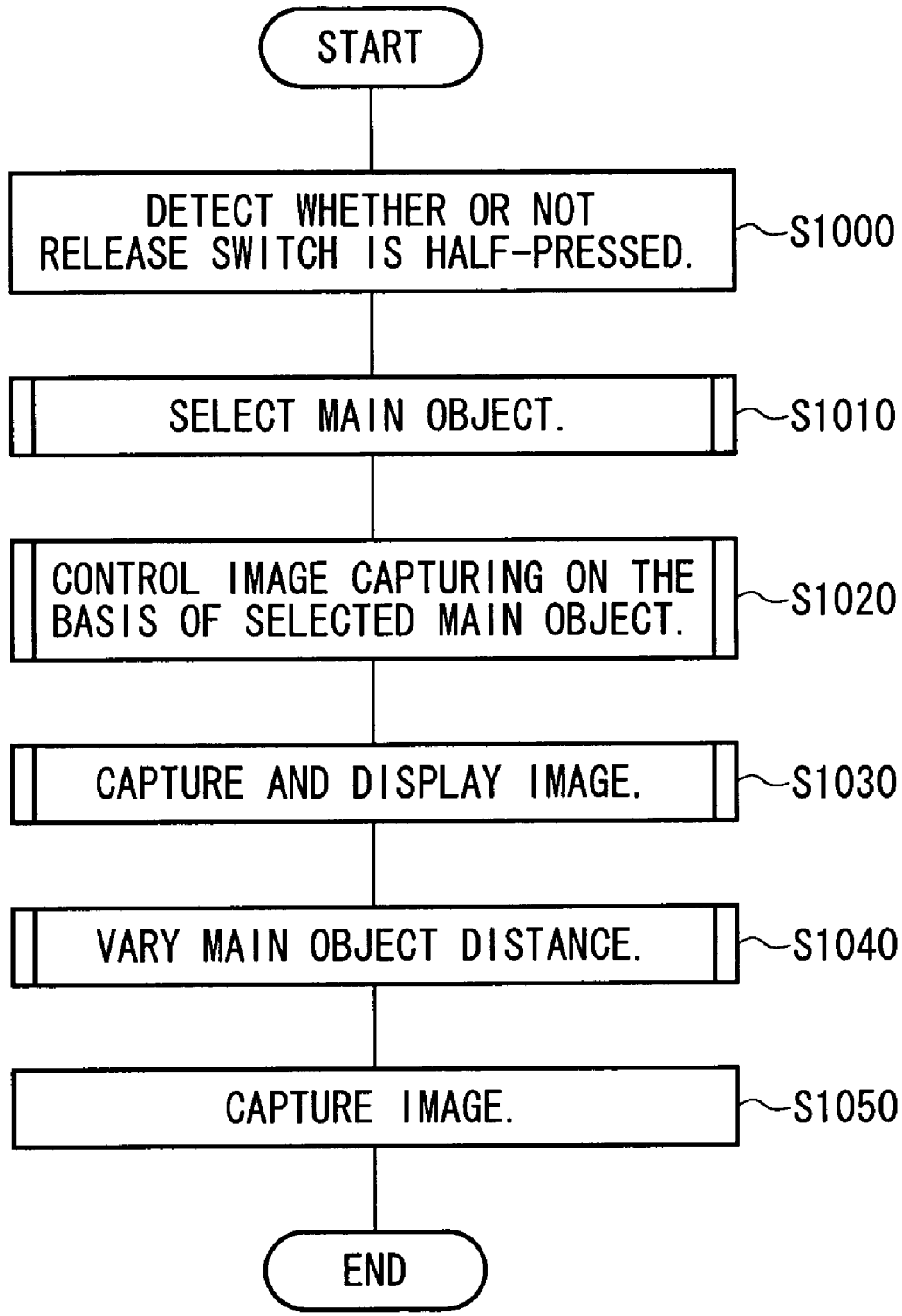
FIG. 6 is a flowchart exemplary showing a process by an image capturing apparatus 20 according to the present embodiment.

FIG. 6 is a flowchart exemplary showing a process by the image capturing apparatus 20 according to the present embodiment. In case the release switch is half-pressed by the user, the image capturing apparatus 20 starts the following processes (S1000). Alternatively, the image capturing apparatus 20 may start the following processes whenever electric power is input. The image capturing apparatus 20 captures an image of an object by using the image capturing module 100 and selects a main object out of the image (S1010). The image capturing apparatus 20 controls the image capturing of the image capturing module 100 by using the image capturing control module 120 based on the selected main object (S1020). Then, the image capturing apparatus 20 captures an image of the object and displays the image on the display module 50 (S1030).

The image capturing apparatus 20 varies the main object distance based on an operation by the user (S1040). In case the release switch is fully pressed, the image capturing apparatus 20 captures an image of an object by using the image capturing module 100 and stores the captured image in the first memory 110. Then, the image capturing apparatus 20 executes an image processing such as a data compression process and stores the image data in the second memory 60 (S1050). Here, in case the name searching module 32 searches for a name of the main object in the database 38, the image capturing apparatus outputs image data of the captured image and information showing the region of the selected main object to the image adjusting module 30, instead of storing the image data in the second memory 60. Further, in case the image adjusting module 30 requires a series of images, the image capturing apparatus 20 may capture images continuously by the release switch's being fully-pressed one time and outputs each image and information showing a region of a main object selected out of the image to the image adjusting module 30.

Figure 7:
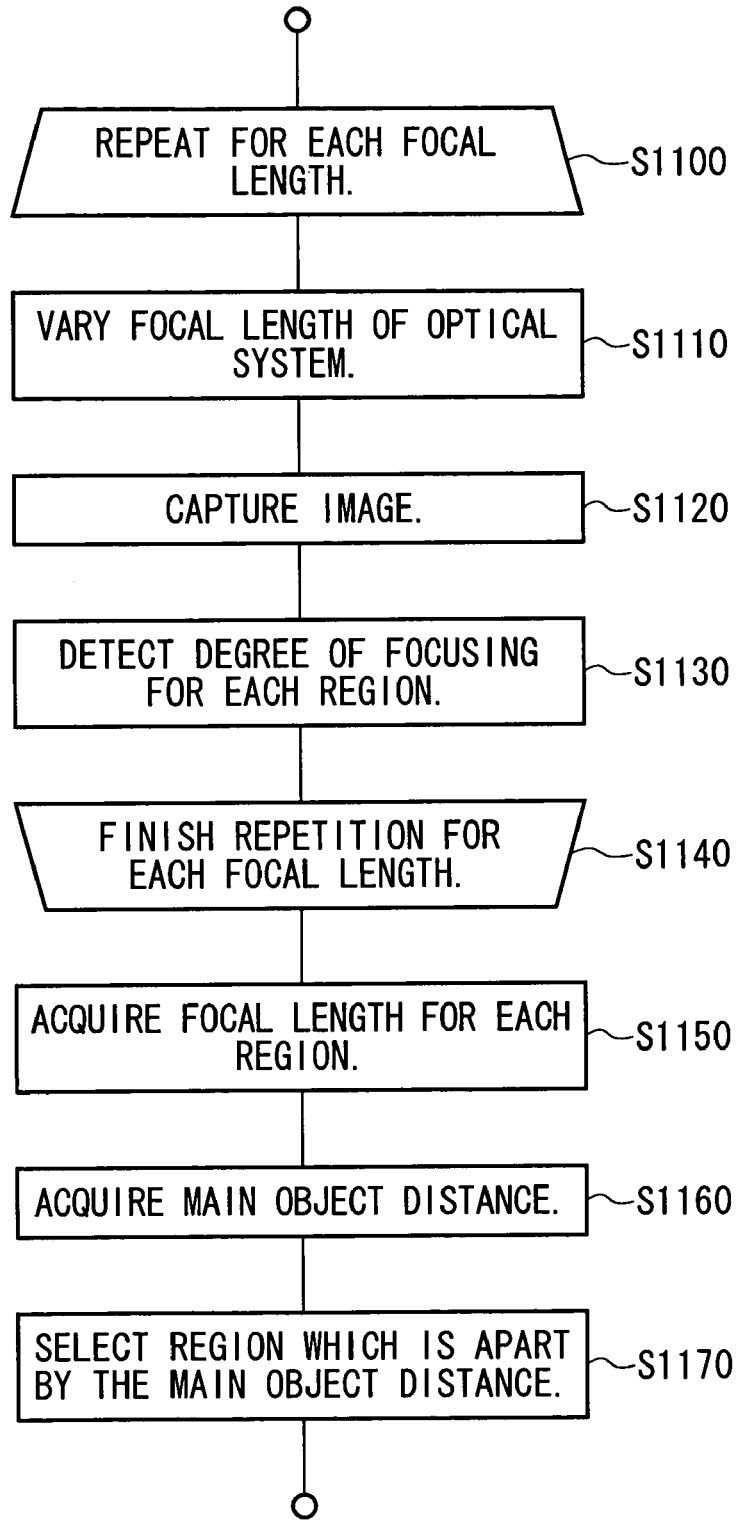
FIG. 7 is a flowchart showing S1010 in detail.

FIG. 7 is a flowchart showing S1010 in detail. The repeatedly capturing module 142 executes the following processes for each of a plurality of predetermined focal lengths (S1100). Here, the predetermined focal lengths are selected from a focusing range of the optical system 102 and necessary for acquiring a main object distance. The focal lengths may not be fixed or varied according to the image capturing mode of the image capturing apparatus 20. For example, in case the image capturing mode is the portrait mode, the image capturing apparatus 20 may select more focal lengths from a region near to the image capturing apparatus 20 than a region far away from the image capturing apparatus 20.

Further, the repeatedly capturing module 142 may display images of 30 frames per a second out of images captured at a frequency higher than 30 frames per a second by using the display module 50 and acquire a focal length by using the other images. Thus, it is possible to capture images at a plurality of focal lengths while displaying images with a constant focal length to the user.

The repeatedly capturing module 142 varies the focal length of the optical system 102 (S1110). The image capturing module 100 captures an image of the object and stores the image data in the first memory 110 (S1120). The focal length acquiring module 144 divides the captured image into a plurality of regions and acquires a degree of focusing for each of the regions (S1130). The image capturing apparatus 20 repeats S1110 to S1130 for each of the plurality of the predetermined focal lengths (S1140).

For each of the regions, the main object distance acquiring module 146 acquires a focal length of the highest degree of focusing out of the plurality of focal lengths, at which the images are captured, as the focal length of the region (S1150) Then, the main object distance acquiring module 146 detects regions having the same focal lengths out of the plurality of regions and acquires the product of the area of each region and the weight predetermined for the region. Then, the main object distance acquiring module 146 calculates the sum of the products each of which is acquired for each region. Then, for each of the focal lengths, the main object distance acquiring module 146 acquires the value of the calculated sum multiplied by the distance weight predetermined for the focal length. The main object distance acquiring module 146 executes the following processes for each group of the regions having the same focal lengths, selects a plurality of focal lengths in the descending order of the acquired values, and selects a focal length having the largest one of the acquired values as the main object distance and the other focal lengths as candidates for the main object distance (S1160). The region selecting module 148 detects a plurality of regions having the main object distance as the main object (S1170).

Figure 8:
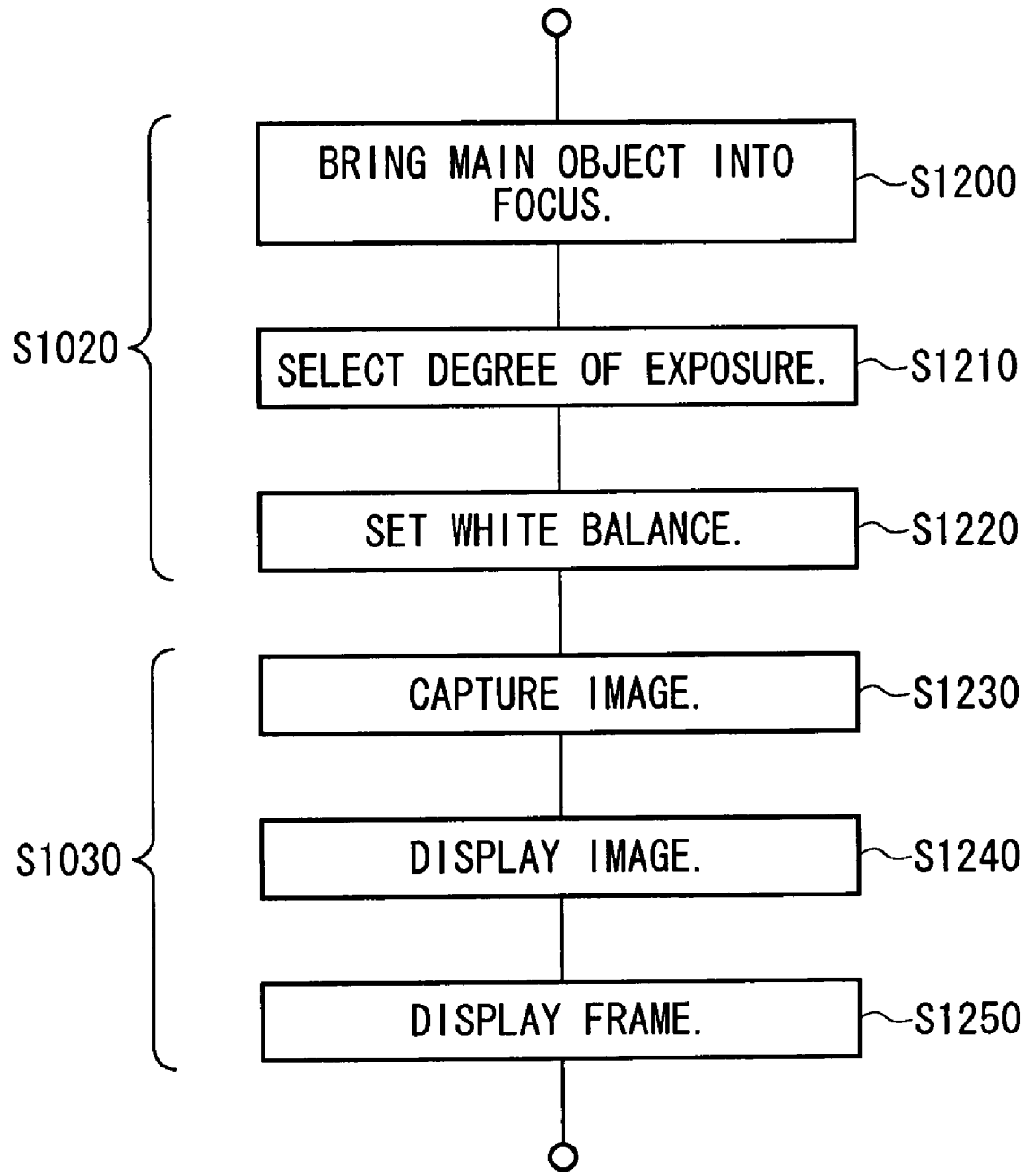
FIG. 8 is a flow chart showing S1020 and S1030 in detail.

FIG. 8 is a flow chart showing S1020 and S1030 in detail. The automatic focusing module 122 controls the optical system 102 to bring the region selected by the region selecting module 148, that is, the main object in to focus (S1200). Further, the exposure selecting module 124 selects the degree of exposure of the image which gives bigger weight to the region selected by the region selecting module 148, that is, the main object than the other regions (S1210). Furthermore, the white balance setting module 126 sets a white balance of the image which gives bigger weight to the region selected by the region selecting module 148, that is, the main object than the other regions (S1220).

The image capturing module 100 captures an image of the object under the image capturing conditions such as the focus, the degree of exposure, and the white balance, which are controlled on the basis of the selected main object (S1230). Then, the display module 50 displays the captured image (S1240). The frame display module 40 displays a frame surrounding the region selected by the region selecting module 148 on the display module 50 so that the frame is superimposed on the captured image (S1250).

Figure 9:
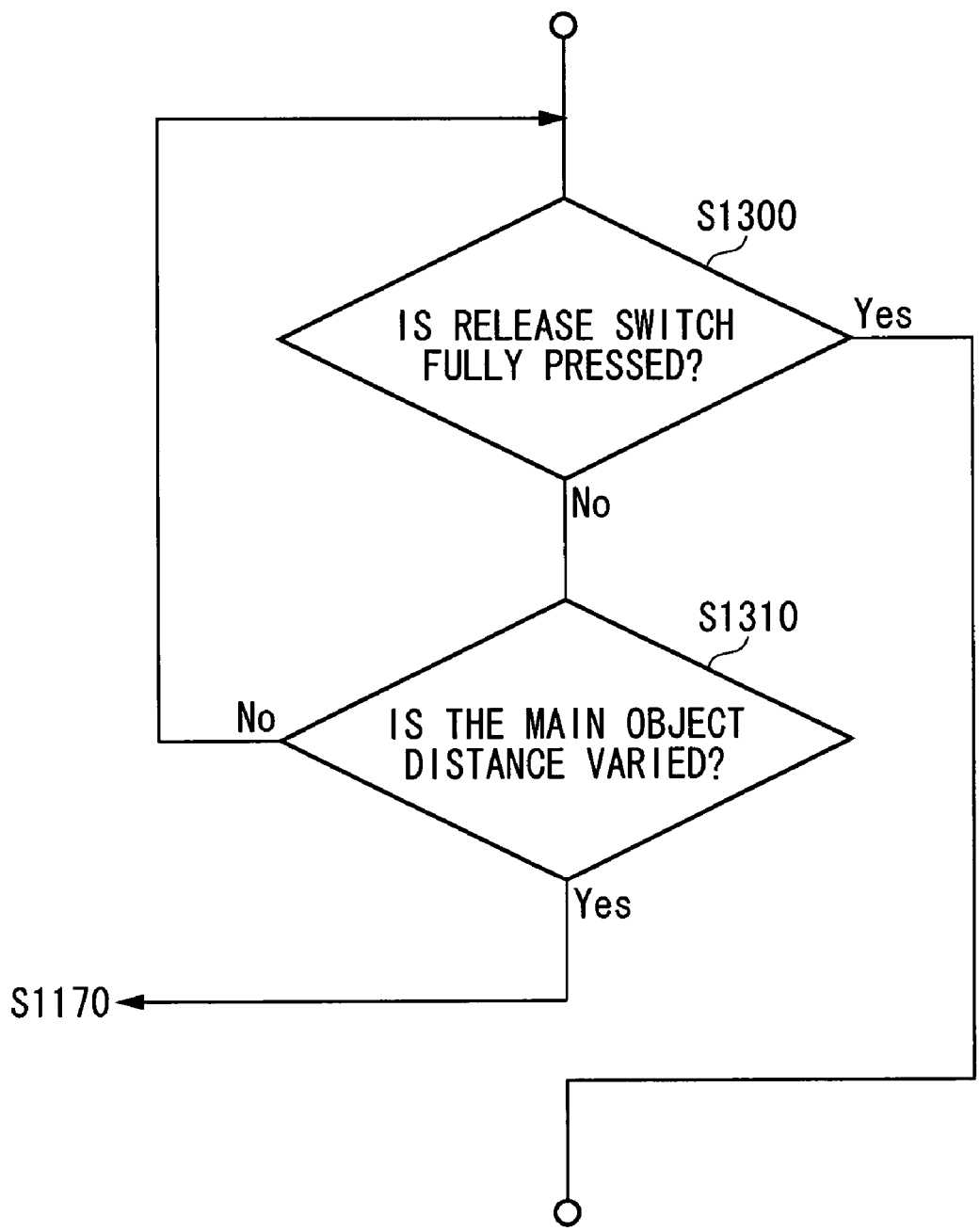
FIG. 9 is a flow chart showing S1040 in detail.

FIG. 9 is a flow chart showing S1040 in detail. The image capturing apparatus 20 determines whether or not the release switch is fully pressed by the user (S1300). In case the release switch is not fully pressed (S1300: No), the image capturing apparatus 20 determines whether or not the main object distance is varied by the variation operation module 150 (S1310). In case the main object distance is not varied (S1310: No), the image capturing apparatus 20 returns to S1300 and determines again whether or not the release switch is fully pressed.

In case the main object distance is varied (S1310: Yes), that is, the user changes the main object distance with one of the candidates for the main object distance in the main object distance acquiring module 146 by using the variation operation module 150, the main object distance acquiring module 146 outputs the changed main object distance to the region selecting module 148. Then, the region selecting module 148 selects again a region apart by the changed main object distance (S1170).

The automatic focusing module 122 drives the optical system 102 so that the optical system 102 is focused at the changed main object distance (S1200). Further, the exposure selecting module 124 selects the degree of exposure of the image which gives bigger weight to the region selected correspondently to the changed main object distance than the other regions (S1210). Furthermore, the white balance setting module 126 sets the white balance of the image which gives bigger weight to the region selected correspondently to the changed main object distance than the other regions (S1220).

The image capturing module 100 captures an image of the object under the image capturing conditions such as the focus, the degree of exposure, and the white balance, which are adjusted on the basis of the changed main object distance (S1230) Then, the display module 50 displays the captured image (S1240) Further, the frame display module 40 displays a frame surrounding the region selected on the basis of the changed main object distance on the display module 50 to inform the user that the main object is changed (S1250).

On the other hand, in case the release switch is fully pressed (S1300: Yes), the image capturing apparatus 20 proceeds to S1050 and captures an image of the object.

According to the image capturing apparatus 20 of the present embodiment, it is possible to capture an image of goof quality which the user desires to obtain by determining the image capturing conditions such as the focus, the degree of exposure, and the white balance on the basis of the main object recognized by the main object selecting module 140 to control the image capturing module 100.

Figure 10:
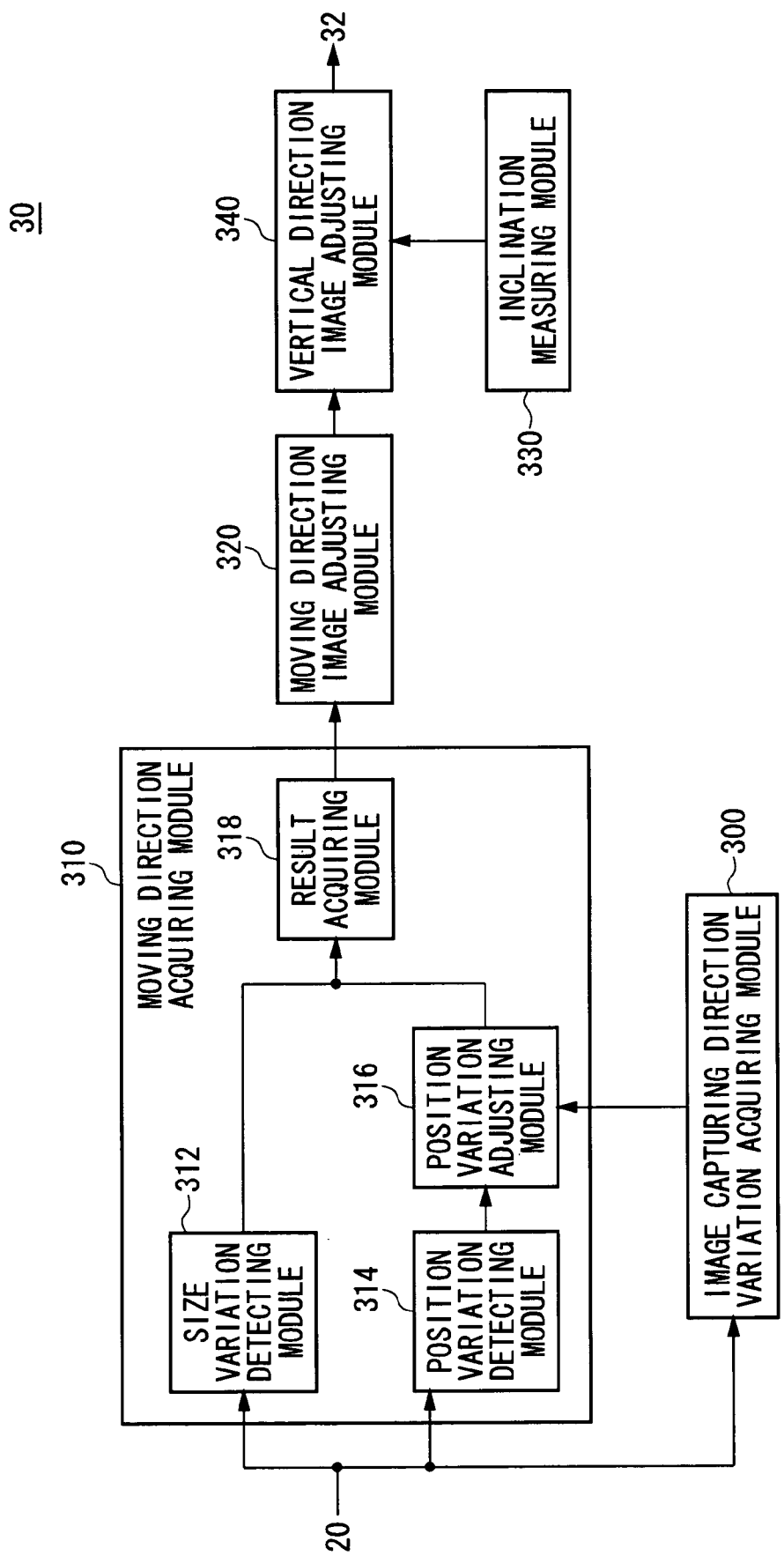
FIG. 10 is a block diagram exemplary showing a configuration of an image adjusting module 30 according to the present embodiment.

FIG. 10 is a block diagram exemplary showing a configuration of the image adjusting module 30 according to the present embodiment. It is an object of the image adjusting module 30 according to the present embodiment to make the name searching module 32 acquire a search result of good accuracy by adjusting an image captured by the image capturing apparatus 20 in case the name searching module 32 searches for a name of a main object in the image database 38 based on the image, even if the main object is not captured at an ideal angle. Here, in case a feature of the object of which image is captured can be best seen and the object can be recognized with good accuracy at an angle, the angle is regarded as the ideal angle. For example, in case the object is a fish, it is when the fish is in the exactly horizontal direction. Further, it is desirable that an image capturing angle stored for each object in the image database 38 is the ideal angle.

The image adjusting module 30 receives images successively captured from the image capturing apparatus 20. Here, the successively captured images may be still images successively captured or images of successive frames extracted from a moving picture. Further, the successively captured images need not be successively captured at a very short time interval, for example, 1/30 second and it is desirable to capture images at a time interval during which a moving direction of a main object does not vary a great deal, in order to make the following calculation easy.

The image adjusting module 30 includes an image capturing direction variation acquiring module 300, a moving direction acquiring module 310, a moving direction image adjusting module 320, an inclination measuring module 330, and a vertical direction image adjusting module 340. The image capturing direction variation acquiring module 300 acquires a variation in the image capturing direction of the image capturing module 100 and outputs the result to the moving direction acquiring module 310. The moving direction acquiring module 310 acquires a moving direction of an object in the three-dimensional space on the basis of the successively captured images which are received from the image capturing apparatus 20 and outputs the acquisition result to the moving direction image adjusting module 320.

The moving direction acquiring module 310 includes a size variation detecting module 312, a position variation detecting module 314, a position variation adjusting module 316, and a result acquiring module 318. The size variation detecting module 312 receives the successively captured images and information showing a region of a main object for each of the successively captured images from the image capturing apparatus 20. The size variation detecting module 312 detects a variation in size of a main object for each of the successively captured images and outputs the detection result to the result acquiring module 318.

The position variation detecting module 314 receives the successively captured images and information showing a region of a main object for each of the successively captured images from the image capturing apparatus 20. Then, the position variation detecting module 314 detects a variation in a position of a main object within a range of image capturing angle of the image capturing apparatus 20 for each of the successively captured images and outputs the detection result to the position variation adjusting module 316. The position variation adjusting module 316 adjusts the quantity of the positional variation of the main object detected by the position variation detecting module 314 on the basis of the variation in the image capturing direction received from the image capturing direction variation acquiring module 300 and outputs the result to the result acquiring module 318.

The result acquiring module 318 acquires the moving direction of the main object on the basis of the variation in the size of the main object received from the size variation detecting module 312 and the variation in the position of the main object within the range of the image capturing angle received from the position variation adjusting module 316. Here, the acquired moving direction may be acquired as a vector of a predetermined coordinate system of which origin, Z-direction, X-direction, and Y-direction are set to a center of a lens, an optical axis, a direction parallel to a plane orthogonal to the optical axis, and a direction perpendicular to both the Z-direction and the X-direction, respectively.

The moving direction image adjusting module 320 adjusts an image of the main object in the image captured by the image capturing apparatus 20 on the basis of the moving direction of the main object acquired by the result acquiring module 318. Specifically, the moving direction image adjusting module 320 adjusts the image of the main object to be an image captured in a predetermined direction on the basis of the moving direction of the main object. Here, the predetermined direction is, for example, a direction in which an image of an object stored in the image database, which the name searching module 32 uses to search for the name of the main object, is captured. More specifically, in case an image of an object stored in the image database 38 is captured when the moving direction of the object is horizontal toward the left in a plane orthogonal to the image capturing direction, the moving direction image adjusting module 320 adjusts the image so that the acquired moving direction of the main object is to be horizontal toward the left in a plane orthogonal to the image capturing direction, by modifying or rotating the image. Further, the moving direction image adjusting module 320 adjusts the information showing the region of the main object in the captured image so that the adjusted information shows a region of the main object in the adjusted image. Then, the moving direction image adjusting module 320 outputs the adjusted image and the adjusted information showing the region of the main object in the adjusted image to the vertical direction adjusting module 340.

The inclination measuring module 330 measures an inclination in the vertical direction of the image capturing module 100 and outputs the result of the measurement to the vertical direction image adjusting module 340. For example, the inclination measuring module 330 measures an inclination in the vertical direction of the image capturing module 100 and outputs the result of the measurement to the vertical direction image adjusting module 340. For example, the inclination measuring module 330 measures an inclination in the vertical direction of the image capturing apparatus 100 by using such as a plumb and an acceleration sensor provided in the image capturing module 100. The vertical direction image adjusting module 340 receives the image adjusted on the basis of the moving direction of the main object and the information showing the region of the main object in the adjusted image from the moving direction image adjusting module 320. Then, the vertical direction image adjusting module 340 adjusts the image of the main object to be an image captured in a predetermined direction by using the inclination measured by the inclination measuring module 330. Here, the image captured in the predetermined direction is, for example, an image captured in the horizontal or vertical direction, that is, an image captured from the side or the above exactly. Further, it is desirable that the predetermined direction is the same as a direction in which an image stored in the image database 38 used to search for the name of the main object by the name searching module 32 is captured. In addition, the vertical direction image adjusting module 340 adjusts information showing the region of the main object so that the adjusted information shows a region of the main object in the adjusted image. Then, the vertical direction image adjusting module 340 outputs the adjusted image and the adjusted information showing the region of the main object in the adjusted image to the name searching module 32.

The name searching module 32 shown in FIG. 1 searches for a name of the main object on the basis of the moving direction of the main object acquired by the moving direction acquiring module 310 and the inclination of the image capturing module 100 measured by the inclination measuring module 330. Specifically, the name searching module 32 receives the image adjusted on the basis of the moving direction of the main object and the inclination in the vertical direction of the image capturing module 100 and the information showing the region of the main object in the adjusted image from the vertical direction image adjusting module 340. Then, the name searching module 32 extracts a feature of the main object from the received image, such as a digitized image of the main object, a contour shape, and a color distribution and searches for a name of the main object in the image database 38 by using the extracted feature. Then, the name searching module 32 displays the search result received from the image database 38 by the display module 50 and thus provides the user with the search result.

According to the digital pictorial book system 10 of the present embodiment, even in case an image is not captured at an ideal angle, it is possible to acquire a search result of good accuracy by adjusting the image on the basis of moving direction of the main object and the inclination in the vertical direction of the image capturing module 100 and using the adjusted image. Thus, even in case it is difficult to capture an image of an object at an ideal angle because sometimes the user looks up or looks down a main object during diving and the main object moves in various directions, a search result of good accuracy can be acquired.

The configuration of the image adjusting module 30 shown in the present figure is an example and many modifications can be made to the configuration. For example, the image adjusting module 30 may not include one of the moving direction image adjusting module 320 and the vertical direction image adjusting module 340. In this case, the image adjusting module 30 adjusts an image with respect to only one of the moving direction and the vertical direction and makes the name searching module 32 perform searching. Further, for example, the image adjusting module 30 may output an image captured by the image capturing apparatus 20, information showing a region of a main object in the image, and information showing at least one of the moving direction of the main object acquired by the moving direction acquiring module 310 and the image capturing direction measured by the inclination measuring module 310 instead of adjusting the image of the main object. In this case, the name searching module 32 transmits the feature extracted from the image of the main object and at least one of the moving direction of the main object and the image capturing direction to the image database 38 and searches-for a name of the main object on the basis of such kinds of information.

Figure 11A:
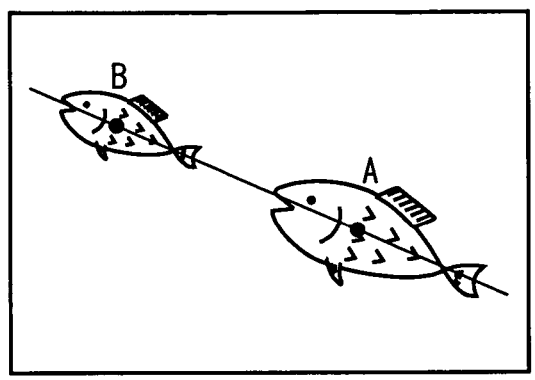
FIG. 11 shows an example of the process by a moving direction acquiring module 310 according to the present embodiment.

FIG. 11 shows an example of the process by the moving direction acquiring module 310 according to the present embodiment. FIG. 11A shows a variation in an image of a main object in images successively captured by the image capturing module 100. It is an object of the moving direction acquiring module 310 according to the present embodiment to acquire a moving direction of the main object including a component of the direction orthogonal to the image shown in FIG. 11A where the main object moves from A to B in two (2) images successively captured.

The moving direction acquiring module 310 acquires a vector of the moving direction of the main object in a plane including A and B, transforms the coordinate of the acquired vector to a predetermined coordinate, and outputs the result to the moving direction adjusting module 320. Here, the predetermined coordinate is a coordinate system of which origin, Z-direction, X-direction and Y-direction are set to a center of a lens, an optical axis, a direction parallel to a plane orthogonal to the optical axis, and a direction perpendicular to both the Z-direction and the X-direction, respectively.

The size variation detecting module 312 extracts the contour of the image of the main object for each of the successively captured images, and, on the basis of the result, detects a variation in the size of the main object by a variation in the lengths of the sides of a circumscribed rectangle of the image of the main object and the like. The position variation detecting module 314 detects a variation in the position of the main object as a degree on the basis of a moving distance of the main object and the image capturing angle of the image capturing angle, specifically, the optical system.

The image capturing direction variation module 300 extracts a background image with the exception of the main object for each of the successively captured images. Then, the image capturing direction variation module 300 acquires a variation in the image capturing direction by acquiring the moving direction and quantity of the movement for each image. Here, since it is a frequent occurrence that the most part of an image captured by the image capturing module 100 is a background, the image capturing direction variation module 300 may acquire the variation in the image capturing direction by acquiring the moving direction and the distance of the movement of the whole image. Instead, the image capturing direction variation module 300 may get information about the rotation of the image capturing module 100, for example, by using an acceleration sensor, and may acquire quantity of the variation in the image capturing direction on the basis of the information. Then, the position variation adjusting module 316 adjusts the acquired quantity of the variation in the position of the main object by adding the quantity of the variation acquired by the image capturing direction variation acquiring module 300 to the detection result of the position variation detecting module 314 and outputs the result to the result acquiring module 318. Thus, the user can capture an image of a main object in a wide range which is not limited to the image capturing angle of the image capturing module 100 and search for a name of the main object.

Figure 11B:
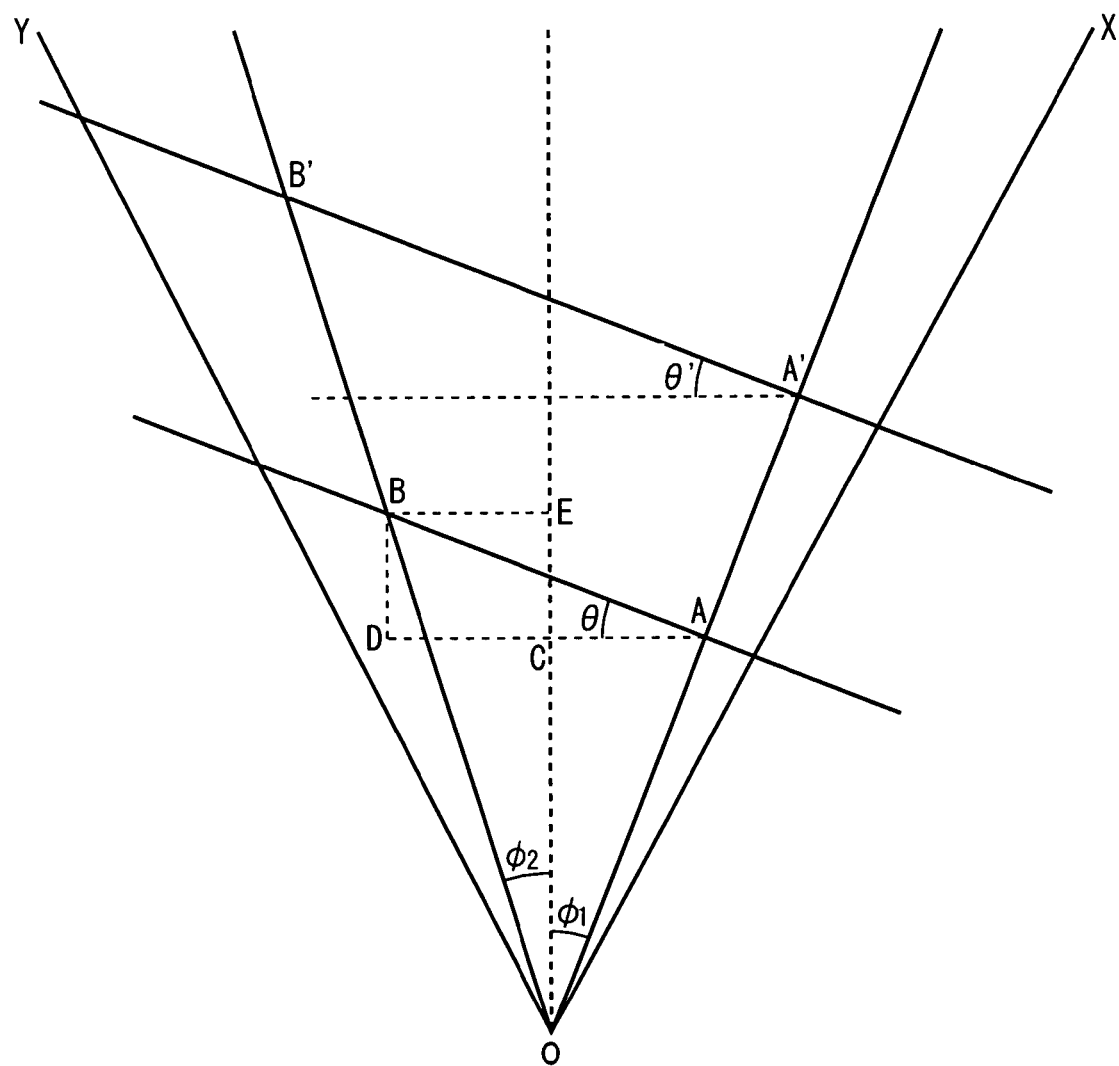
Figure 12A:
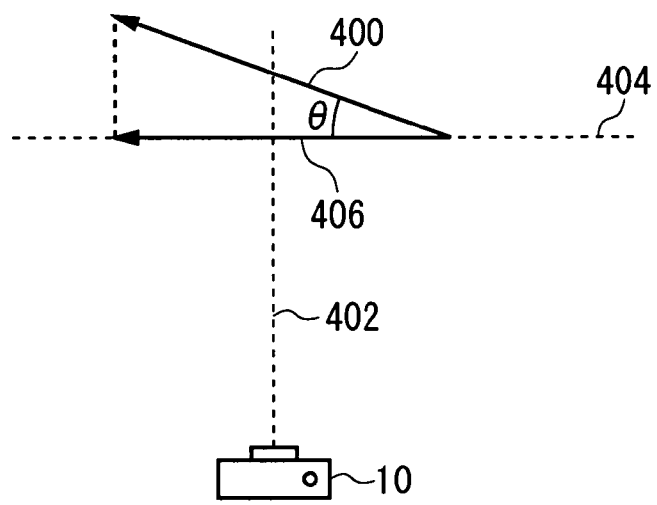
FIG. 12 shows an example of the process by a moving direction image adjusting module 320 according to the present embodiment.
Figure 12B:
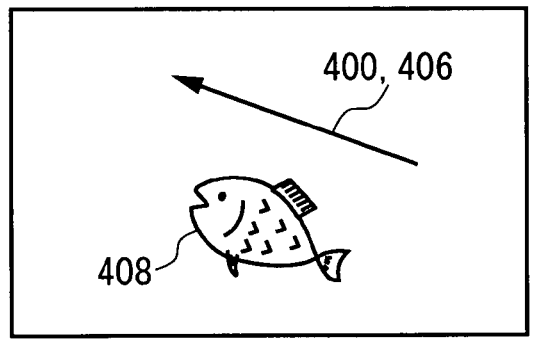
Figure 12C:
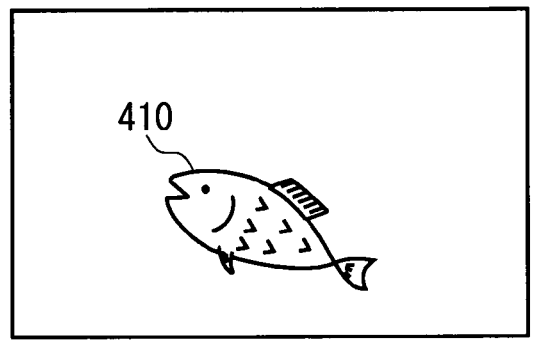
Figure 12D:
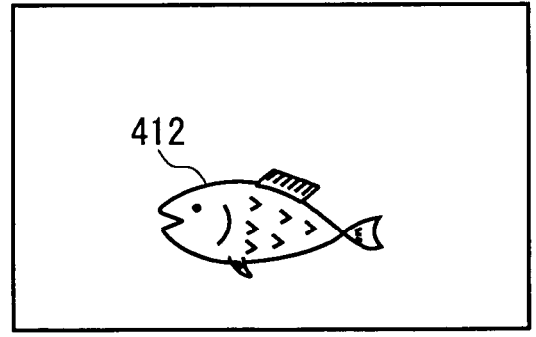

FIG. 11B shows an example of the process of acquiring the moving direction in a plane on which a main object moves. In the present example, let a ratio of a variation in the size of the main object detected by the size variation detecting module 312 be a (a ration of a variation in the area is to be $\alpha^2$) in case the main object moves from A to B. Further, in case the position variation adjusting module 316 divides an angle of a variation in the position of the main object into two parts by a line which passes the center of the lens of the image capturing module 100 on a projection plane and outputs the angles of two parts, let the angles be φ1 and φ2. In the present figure, the region between OX and OY is a section of a space of which image can be captured by the image capturing module 100 cut by a plane passing A and B. Further, the moving direction of the main object to be acquired is indicated by an angle θ.

Since the moving direction acquiring module 310 has information on the actual size of the main object, it is impossible to determine which one of a straight line passing A and B and a straight line passing A' and B' the main object moves on by using only the quantity of the variation in the size of the main object detected by the size variation detecting module 312 and the quantity of the variation in the position of the main object output from the position variation adjusting module 316. However, since the ratio of OA and OB is the same as the ratio the ratio of OA' and OB' and thus a triangle OAB is similar with a triangle OA'B', the angles θ and θ' each of which is formed by a plane orthogonal to the image capturing direction and the straight lines AB and A'B' on which the main object moves, respectively, are the same. Further, it is enough that the moving direction acquiring module 310 of the present example acquires θ or θ' as the moving direction of the main object but it is unnecessary for the moving direction acquiring module 310 to determine which one of the straight lines the main object moves on, in other words, to acquire an actual moving distance of the main object. Thus, in the present example, let the distance from the image capturing module 100 to A, that is, OA be one (1). Therefore, let OB be 1/α in the present example.

The result acquiring module 318 acquires AD, which is the moving distance in the direction orthogonal to the image capturing direction in case the main object moves from A to B, by the following equations.

$$AC = OA\sin\phi_1 = \sin\phi_1 \qquad \text{(Equation 1)}$$

$$CD = EB = OB\sin\phi_2 = \frac{1}{\alpha}\sin\phi_2$$

$$AD = AC + CD = \sin\phi_1 + \frac{1}{\alpha}\sin\phi_2$$

Then, the result acquiring module 318 acquires DB, which is the moving distance in the direction parallel to the image capturing direction in case the main object moves from A to B, by the following equations.

$$OC = OA\cos\phi_1 = \cos\phi_1 \qquad \text{(Equation 2)}$$

$$OE = OB\cos\phi_2 = \frac{1}{\alpha}\cos\phi_2$$

$$DB = OE - OC = \frac{1}{\alpha}\cos\phi_2 - \cos\phi_1$$

Further, the result acquiring module 318 acquires a tan of θ by the following equation.

$$\tan\theta = \frac{DB}{AD} = \frac{\frac{1}{\alpha}\cos\phi_2 - \cos\phi_1}{\sin\phi_1 + \frac{1}{\alpha}\sin\phi_2} = \frac{\cos\phi_2 - \alpha\cos\phi_1}{\alpha\sin\phi_1 + \sin\phi_2} \qquad \text{(Equation 3)}$$

Then, the result acquiring module 318 acquires θ, for example, referring to a table of trigonometrical function. The result acquiring module 318 acquires a vector showing a moving direction of the main object by acquiring a vector, which exists on a plane including A and B and has an inclination of an angle a in the direction orthogonal to the image capturing direction, and applying a coordinate transformation into a predetermined coordinate system to the vector.

FIG. 12 shows an example of the process by the moving direction image adjusting module 320 according to the present embodiment. FIG. 12A is a top view exemplary showing a vector 400 of a moving direction of the main object. FIG. 12B shows an example of an image captured by the image capturing apparatus 20. FIG. 12C shows an example of the image adjusted by the moving direction image adjusting module 320. FIG. 12D shows an example of the image further adjusted by the moving direction image adjusting module 320.

The moving direction image adjusting module 320 adjusts an image 408 of the main object to be an image 410 by expanding the image 408 to a direction of a projected vector 406, which is provided by projecting a vector of the moving direction 400 on a plane 404 orthogonal to the image capturing direction 402, at the same rate as needed to expand the projected vector 406 to have the length of the vector of the moving direction 400. Further, the moving direction image adjusting module 320 adjusts the image 410 by rotating the image 410 and outputs the adjusted image 412 to the vertical direction image adjusting module 340.

According to the digital pictorial book system 10 of the present embodiment, even in case a moving direction of the main object in a three-dimensional space has a component orthogonal to the image capturing direction and the image of the main object in the captured image varies, it is possible to search for a name of the main object accurately by adjusting the image to be an image captured at an ideal angle, for example, an image captured from the side exactly.

Figure 13:
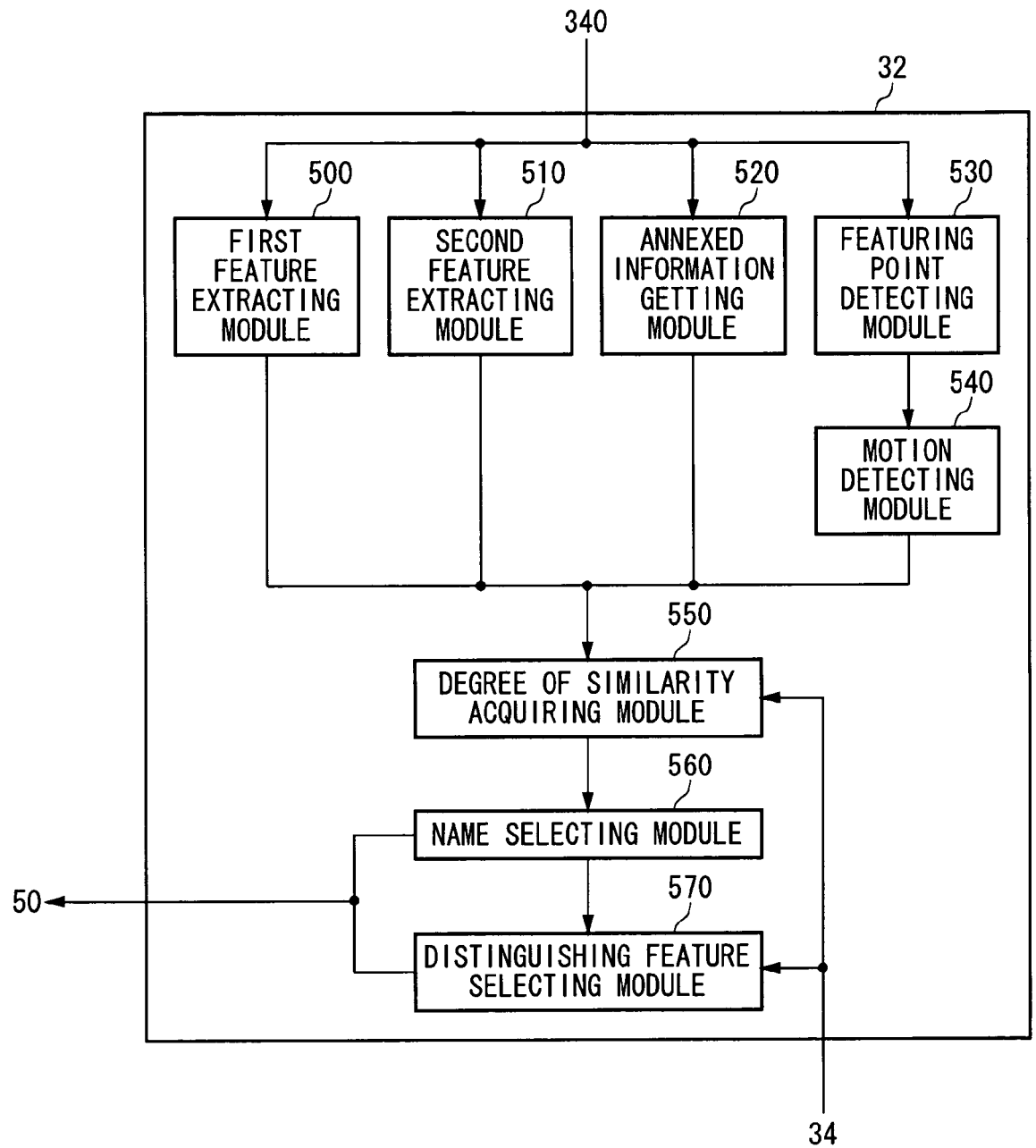
FIG. 13 is a block diagram exemplary showing a configuration of a name searching module 32 of the present embodiment.

FIG. 13 is a block diagram exemplary showing a configuration of the name searching module 32 of the present embodiment. The name searching module 32 includes a first feature extracting module 500, a second feature extracting module 510, an annexed information acquiring module 520, a featuring point detecting module 530, a motion detecting module 540, a degree of similarity acquiring module 550, a name selecting module 560, and a distinguishing feature selecting module 570.

The first feature extracting module 500 receives the image adjusted on the basis of the moving direction of the main object and the inclination of the image capturing module 100 and information showing an adjusted region of the main object in the adjusted image from the vertical direction image adjusting module 340 shown in FIG. 10. Then, the first feature extracting module 500 extracts a feature of the main object from the adjusted image. The first feature extracting module 500 outputs information showing the extracted feature to the degree of similarity acquiring module 550. The second feature extracting module 510 receives the adjusted image and information showing an adjusted region of the main object in the adjusted image from the vertical direction image adjusting module 340. Then, the second feature extracting module 510 extracts a feature of an object other than the main object from the adjusted image. The second feature extracting module 510 outputs information showing the extracted feature to the degree of similarity acquiring module 550.

The annexed information acquiring module 520 acquires information annexed to the image captured by the image capturing apparatus 20 through the image adjusting module 30. Here, the annexed information may include, for example, latitude, longitude, altitude, and depth of the place where the image is captured, acquired by GPS (Global Positioning System) included in the image capturing apparatus 20. Further, the annexed information may include, for example, the image capturing date and/or time acquired by a calendar function of the image capturing apparatus 20 and information on a season based on the date and/or time. Furthermore, the annexed information may include, for example, a temperature or a water temperature acquired by a thermometer provided in the image capturing apparatus 20. Furthermore, the annexed information may include, for example, a distance from the image capturing apparatus 20 to the main object acquired by the main object distance acquiring module 146, the size of the main object in the image, and information on the actual size of the main object acquired by using an image capturing magnification of the image capturing apparatus 20. Then, the annexed information acquiring module 520 outputs the acquired information to the degree of similarity acquiring module 550.

In case the image capturing apparatus 20, which is a digital video camera, captures a moving picture, the featuring point detecting module 530 receives a plurality of frame images, which are included in the moving picture and each of which is adjusted, and information showing an adjusted region of the main object in each adjusted image from the vertical direction image adjusting module 340. Then, the featuring point detecting module 530 detects a featuring point included in the main object of each of the received images. The featuring point detecting module 530 outputs each of the received images, the information showing the main object in the image, and the position of the featuring point detected from the image to the motion detecting module 540. The motion detecting module 540 detects motion of the main object on the basis of the main object in each of the plurality of frame images included in the moving picture captured by the image capturing apparatus 20. Specifically, the motion detecting module 540 may detect the motion of the main object on the basis of a variation in the position of the featuring point detected by the featuring point detecting module 530 for each of the plurality of frame images. The motion detecting module 540 outputs information showing the detected motion of the main object to the degree of similarity acquiring module 550.

The degree of similarity acquiring module 550 acquires a degree of similarity between each of a plurality of objects, of which name is stored in the image database 38, and the main object on the basis of the feature of the main object received from the first feature extracting module 500. Specifically, for each of the plurality of objects of which name is stored in the image database 38, the degree of similarity acquiring module 550 acquires a feature of the object from the image database 38 through the communication module 34. Then, for each of the plurality of objects of which name is stored in the image database 38, the degree of similarity acquiring module 550 acquires a degree of similarity between each of the plurality of objects and the main object by comparing the feature of the object with the feature of the main object extracted by the first feature extracting module 500.

Here, the degree of similarity acquiring module 550 may acquire a degree of similarity between each of the plurality of objects and the main object further on the basis of the feature of the object other than the main object in the adjusted image, which is received from the second feature extracting module 510. Further, the degree of similarity acquiring module 550 may acquire a degree of similarity between each of the plurality of objects and the main object further on the basis of the annexed information which is annexed to the captured image and received from the annexed information acquiring module 520. Furthermore, the degree of similarity acquiring module 550 may acquire a degree of similarity between each of the plurality of objects and the main object further on the basis of the information showing the motion of the main object received from the motion detecting module 540. Then, the degree of similarity acquiring module 550 outputs the acquired degree of similarity to the name selecting module 560.

On the basis of the degree of similarity between each of a plurality of objects, of which name is stored in the image database 38, and the main object, which is acquired by the degree of similarity acquiring module 550 for each of the plurality of objects, the name selecting module 560 selects a name of the main object out of the names of the plurality of objects. For example, the name selecting module 560 may select one out of the names of the objects, which has the highest degree of similarity. Instead, the name selecting module 560 may select a predetermined number of names out of the names of the objects, which have the higher degrees of similarity. Here, the predetermined number may be determined by the user or according to distribution of the acquired degree of similarity indicated by, for example, the value of the highest degree of similarity. Then, the name selecting module 560 displays the selected name on the display module 50. Further, the name selecting module 560 outputs the selected name to the distinguishing feature selecting module 570.

In case of distinguishing each of the objects indicated by each of the plurality of names selected by the name selecting module 560 by comparing the features of the objects, the distinguishing feature selecting module 570 selects a distinguishing feature which distinguishes each object most easily out of the different features of the objects. Then the distinguishing feature selecting module 570 displays information showing the selected distinguishing feature on the display module 50.

According to the digital pictorial book system 10 of the present embodiment, it is possible to extract a feature of the main object from an image which is provided by adjusting the captured image so that the main object's image is captured in the horizontal direction, an image which is provided by adjusting the captured image so that the main object's image is captured in the vertical direction, or an image which is provided by adjusting the captured image on the basis of the moving direction of the main object. In addition, it is possible to acquire a degree of similarity between each object and the main object by comparing the feature of each object stored in the image database 38 with the extracted feature of the main object and to search for the name of the main object based on the degree of similarity. Thus, even in case an image of the main object is not captured at an ideal angle, it is possible to search for the name of the object accurately.

In the meantime, since an image including a distinguishing part of the main object cannot be captured due to the image capturing angle, sometimes it is difficult to select the name as the name of the main object uniquely. However, according to the digital pictorial book system 10, it is possible to provide information of higher accuracy regardless of difficulty in selecting the name uniquely as the name of the main object by displaying the plurality of names having high degrees of similarity in comparison with displaying only one name having a relatively high degree of similarity.

Figure 14:
FIG. 14 shows a first example of an image database 38 according to the present embodiment.

FIG. 14 shows a first example of the image database 38 according to the present embodiment. In the present example, the image database 38 stores a name of an object further corresponded to a feature of a thing having high relevance with the object in addition to a features of the object. Here, the feature of the object may include diverse information such as a contour shape, a digitized image, a color distribution, and an appearance extracted from an image of the object captured at an ideal angle, for example, in the horizontal direction, or the image to which a conventional image processing technique is applied. The image database 38 of the present example stores a feature of a background of the object as the feature of a thing having high relevance with the object. For example, in case an image of a fish is captured and the image database 38 stores a feature of the fish corresponded to a name of the fish, the image database 38 stores a feature of a thing having a high probability of existing in the background of the image, such as rock and coral which are a habitat of the fish. Then, for each of the plurality of objects of which name is stored in the image database 38, the degree of similarity acquiring module 550 acquires information showing a feature of the object stored in the image database 38 and information showing a feature of the thing having high relevance with the object through the communication module 34.

The degree of similarity acquiring module 550 acquires a degree of similarity between each of the plurality of objects and the main object by comparing a feature of each of the plurality of objects and the feature of the main object extracted by the first feature extracting module 500 and comparing a feature of a thing having high relevance with the object and the feature of an object other than the main objects extracted by the second feature extracting module 510. For example, for each of the plurality of objects, the degree of similarity acquiring module 550 acquires a degree of similarity by comparing a feature of the background of the object acquired from the image database 38 and a feature extracted from an image other than the image of the main object out of the image adjusted by the image adjusting module 30. Here, in case the feature extracted from the image other than the image of the main object out of the image adjusted by the image adjusting module 30 includes a feature having a degree of similarity with the feature of the background stored in the image database 38, of which value is larger than a reference value predetermined by, for example, the user, the degree of similarity acquiring module 550 may acquire a degree of similarity between each object and the main object by acquiring a degree of similarity between a feature of an object stored in the image database 38 and the feature of the main object and then increasing the degree of similarity by a predetermined percentage, for example, 30 percent (%).

Then, on the basis of the degree of similarity acquired for each of the plurality of objects, the name selecting module 560 selects a name out of the plurality of objects and displays the selected name on the display module 50.

According to the pictorial book system 10 of the present embodiment, it is possible to search for the name of the main object further on the basis of a feature of an object having high relevance with the main object, for example, a thing in the background in the captured image and a thing having a high probability of existing around the main object, in addition to the feature of the main object. Thus, it is possible to search for the name of the main object with higher accuracy.

Figure 15:
FIG. 15 shows a second example of the image database 38 according to the present embodiment.

FIG. 15 shows a second example of the image database 38 according to the present embodiment. In the present example, the image database 38 stores a name of an object further corresponded to information annexed to a feature of the object in addition to the features of the object. Specifically, the image database 38 stores a range of a water temperature at the time of capturing the object's image, that is, a range of a temperature of water in which the object is living, as the annexed information. Then, for each of the plurality of objects of which name is stored in the image database 38, the degree of similarity acquiring module 550 acquires the information showing a feature of the object stored in the image database 38 and the range of the water temperature at the time of capturing the object's image.

The degree of similarity acquiring module 550 acquires a degree of similarity between each of the plurality of objects and the main object by comparing a feature of each of the plurality of objects and the feature of the main object extracted by the first feature extracting module 500 and comparing the annexed information annexed to the image of the main object and the annexed information acquired by the annexed information acquiring module 520. Here, in case a water temperature at the time when the image capturing module 20 captures an image is included in the range of the water temperature stored in the image database 38, the degree of similarity acquiring module 550 may acquire a degree of similarity between each object and the main object by acquiring a degree of similarity between a feature of an object stored in the image database 38 and the feature of the main object and then increasing the degree of similarity by a predetermined percentage, for example, 30 percent (%).

Then, on the basis of the degree of similarity acquired for each of the plurality of objects, the name selecting module 560 selects a name out of the plurality of objects and displays the selected name on the display module 50.

According to the pictorial book system 10 of the present embodiment, it is possible to search for the name of the main object further on the basis of information annexed to the captured image, for example, a temperature or a water temperature at the time of capturing the image, a date and/or time of capturing the image, and the place where the image is captured, in addition to the feature of the main object. Thus, it is possible to search for the name of the main object with higher accuracy.

FIG. 16 shows an example of the process by the distinguishing feature selecting module 570 according to the present embodiment. The distinguishing feature selecting module 570 selects a distinguishing feature, of which the certainty distribution has the smallest overlap with that of each feature of each name and each kind of feature of the object, out of different kinds of features which are stored in the image database 38 and corresponded respectively to the plurality of names, in case the name selecting module 560 selects a plurality of names. In the following, it will be described about the detailed example of the distinguishing feature selected by the distinguishing feature selecting module 570.

FIG. 16A shows examples of certainty distributions for kinds of features and objects, respectively. The certainty distribution corresponded to each of the objects (parrot fish, red seabream, etc.) and each kind of features (feature A, feature B, etc.) shows a relationship of a quantity of feature showing a value of the feature with a probability of the object having the respective name. Specifically, the distribution 600 shows that the probability of the object's having the name of "Parrot fish" is P1 in case the quantity of the feature extracted from the object is V1. FIG. 16B shows the overlap of the certainty distributions respectively corresponded to the parrot fish and the red seabream for the feature A. FIG. 16C shows the overlap of the certainty distributions respectively corresponded to the parrot fish and the red seabream for the feature B.

As shown in FIG. 16B, both the parrot fish and the red seabream are included in the group of objects of which quantities of features are V5 for the feature A. This is because the overlap of the certainty distributions of features of the parrot fish and the red seabream is large for the feature A. In other words, it is not easy to distinguish between the parrot fish and the red seabream with the feature A in case the names of the parrot fish and the red seabream are selected by the name selecting module 560. In the mean time, as shown in FIG. 16C, the parrot fish but not the red seabream is included in the group of objects of which quantities of features are V6 for the feature B. This is because the overlap of the certainty distributions of features of the parrot fish and the red seabream is small for the feature B. In other words, it is possible to distinguish between the parrot fish and the red seabream easily with the feature B in case the names of the parrot fish and the red seabream are selected by the name selecting module 560.

The distinguishing feature selecting module 570 acquires the size of the overlap of certainty distributions of the features for respective objects and features from the image database 38. Then, the distinguishing feature selecting module 570 selects feature B as the distinguishing feature in case it is needed to distinguish between the parrot fish and the red seabream. Further, the distinguishing feature selecting module 570 displays the information showing the selected distinguishing feature on the display module 50. For example, in case the image of the part shown by the feature of the object corresponded to each of the features of the object is stored in the image database 38, the distinguishing feature selecting module 570 retrieves the image of the part shown by the selected distinguishing feature of the object corresponded to each of the plurality of names from the image database 38, each name being selected by each name selecting module 560. Then, the distinguishing feature selecting module 570 may display the image of the part shown by the distinguishing feature of the object having the name retrieved from the image database 38 corresponded to each of the plurality of names selected by each of the name selecting module 560 on the display module 50.

As described above with reference to FIG. 13, according to the digital pictorial book system 10 of the present embodiment, it is possible to display names of the plurality of objects which have high similarities to the main object without capturing image including featuring parts of the main object in case it is difficult to determine the name of the main object uniquely. Further, in this case, it is possible to carefully support the user to observe the object with the digital pictorial book system by providing the user with information showing the distinguishing feature selected by the distinguishing feature selecting module 570. For example, in case names of a plurality of fishes having similar appearances are displayed, it is possible to provide the user with the information showing how to distinguish each fish by displaying images showing looks of tail fins which are greatly different features of respective fishes putting the names side by side.

Figure 17A:
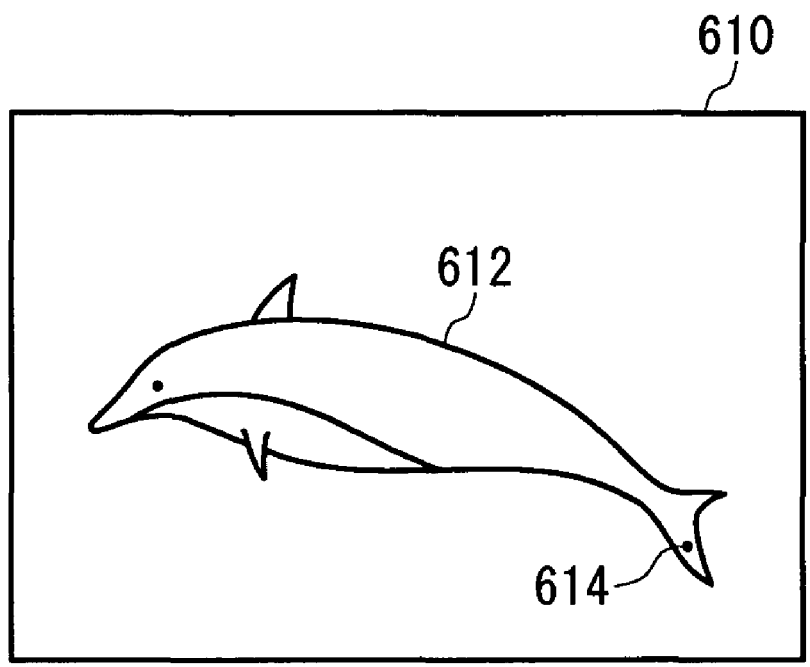
FIG. 17 shows an example of the process by a motion detecting module 540 according to the present embodiment.
Figure 17B:
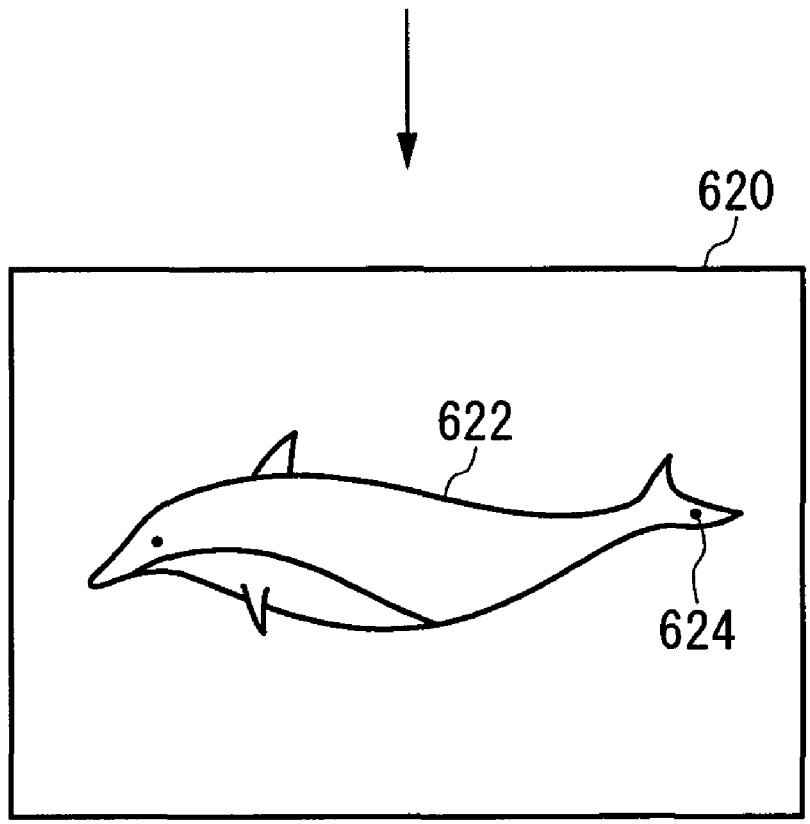

FIG. 17 shows an example of the process by the motion detecting module 540 according to the present embodiment. The image capturing apparatus 20 captures a moving picture according to this embodiment. Then, the moving picture includes frame images 610 and 620. First, the featuring point detecting module 530 detects a featuring point 614 included in the main object 612 of the frame image 610. Then, the featuring point detecting module 530 detects a featuring point 624 included in the main object 622 of the frame image 620. Here, the featuring point detecting module 530 may select a point included in a part of a relatively large variation of shape or position in the plurality of frame images out of a plurality of points included in the main object. Further, in this case, the featuring point detecting module 530 may include a buffer memory which can hold the plurality of frame images temporarily. Further, in this drawing, the featuring point detecting module 530 detects one (1) featuring point of the main object, but may also detect a plurality of points in each frame image.

Then, the degree of similarity acquiring module 550 detects the movement of the main object on the basis of the variation of the position of the featuring point 624 from the position of the featuring point 614. For example, the degree of similarity acquiring module 550 may detect a displacement vector showing the variation of position of the featuring point as the information showing the movement of the main object. Further, the degree of similarity acquiring module 550 may detect the movement of the main object on the basis of other information such as variation of, for example, the whole image or the contour shape of the main object instead of the variation of the position of the featuring point detected by the featuring point detecting module 530.

In the meantime, the image database 38 of the present embodiment stores the name of the object further corresponded to the movement information showing the movement of the object in addition to the feature of the object. Here, the movement information may be, for example, a displacement vector showing a time variation of the position of the featuring point included in the part of the object in case the object has moved, or a moving picture showing the object in motion. Further, the movement information may be, for example, information showing a time variation of a three-dimensional model of the object in motion in case the image database 38 stores the image of the object as three-dimensional information such as a three-dimensional model.

Then, the degree of similarity acquiring module 50 acquires information showing the feature of the object stored in the image database 38 and the movement information of the object for each of the plurality of objects of whose names are stored in the image database 38. Then, the degree of similarity acquiring module 50 compares the feature of the object with the feature of the main object extracted by the first feature extracting module 500, and acquires the degree of similarity between the main object and each of the plurality of objects by comparing the movement of the object shown by the movement information with the movement of the main object detected by the motion detecting module 540 for each of the plurality of objects. Here, for example, after the degree of similarity between the feature of the main object and the feature of the object stored in the image database 38 is acquired, the degree of similarity acquiring module 550 may acquire the degree of similarity between the main object and each object by increasing the acquired degree of similarity by a predetermined percentage, such as 30 percent (%), in case the displacement vector of the featuring point included in the part showing the tail fin of the main object is similar to the displacement vector of the featuring point included in the part showing the tail fin stored in the image database 38 by the degree of similarity higher than a reference value predetermined by, for example, the user.

Then, the name selecting module 560 selects the name of the main object from the plurality of names of the objects on the basis of the acquired degree of similarity for each of the plurality of objects, and displays the selected name on the display module 50.

According to the digital pictorial book system 10 of the present embodiment, it is possible to search out the name of the main object further on the basis of the information showing the movement of the main object obtainable from the moving picture as well as the information such as the feature of the image obtainable from the still image. Due to this, it is possible to search out the name of the main object with higher accuracy than the case of searching on the basis of only the information obtainable from the still image when the main object shows a distinctive movement.

Further, it is possible to increase the speed of the searching process and decrease the size of the digital pictorial book system 10 since it is possible to search out the name of the main object on the basis of the movement with less amount of information by searching for the movement of the main object with the variation of position of the featuring point included in the main object than the case of searching the movement with the variation of the whole image.

Further, the featuring point detecting module 530 and the motion detecting module 540 may perform detecting the featuring point and searching for the movement of the main object on the basis of the frame image before adjustment not on the basis of the frame image adjusted by the image adjusting module 30. In this case, however, the degree of similarity acquiring module 550 may adjust the moving direction detected by the motion detecting module 540 on the basis of the moving direction detected by the motion detecting module 540, the moving direction of the main object acquired by the moving direction acquiring module 310, wherein the moving direction making the displacement vector of the featuring point be a direction in a coordinate system similar to that for the moving direction of the movement information stored in the image database 38, and the moving direction of each object stored in the image database 38, or the image capturing direction measured by the inclination measuring module 330 and the image capturing direction stored in the image database 38.

Further, according to the present embodiment, the image database 38 stores the information of feature and movement of the object for each object, but the image database may not store the feature of the object. In this case, the degree of similarity acquiring module 550 may acquire the degree of similarity between the main object and the object stored in the image database 38 by only using the feature of the main object detected the motion detecting module 540 or by further using the information and a feature other than the feature of the main object, etc.

Figure 18:
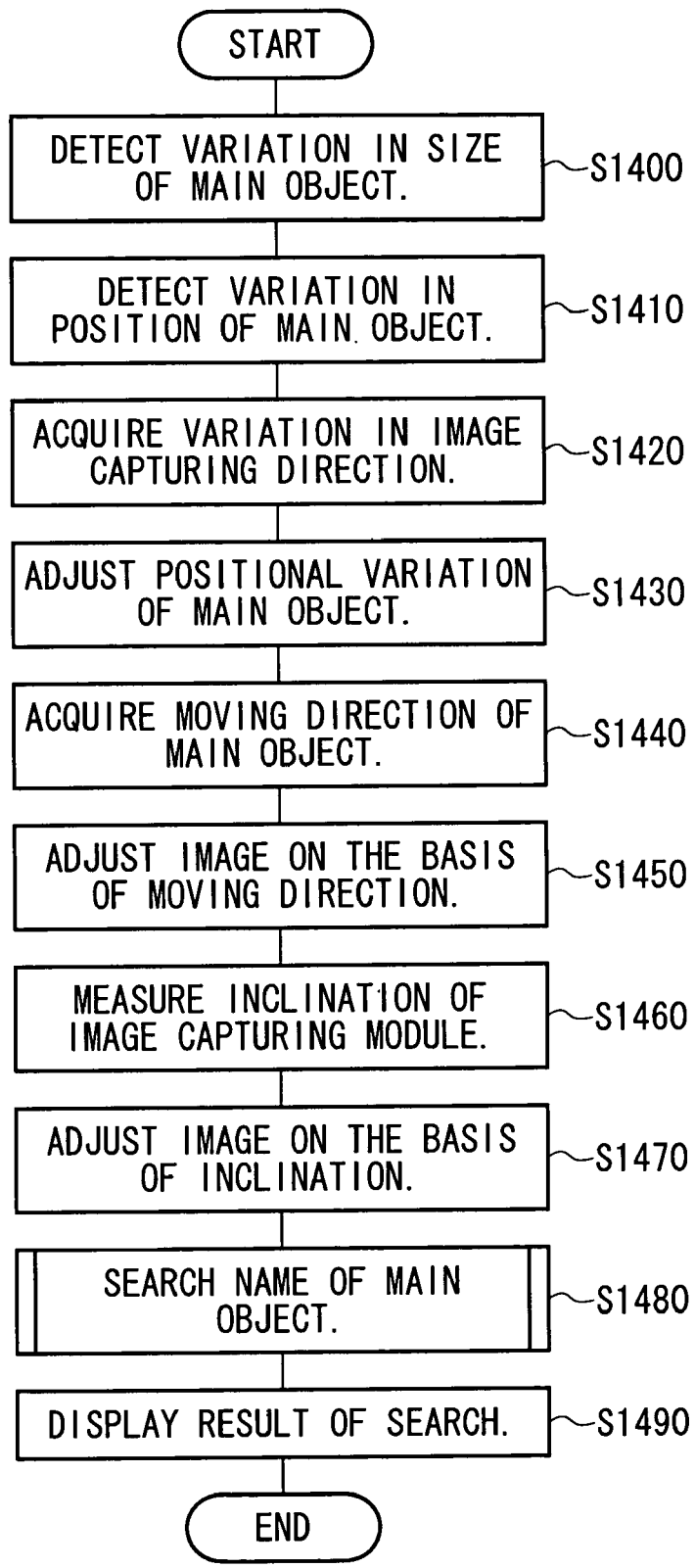
FIG. 18 is a flowchart exemplary showing a process flow by the digital pictorial book system 10 according to the present embodiment.

FIG. 18 is a flowchart exemplary showing a process flow by the digital pictorial book system 10 according to the present embodiment. First, the size variation detecting module 312 detects the variation of the size of the main object in the images captured by the image capturing apparatus 20 successively (S1400). Then, the position variation detecting module 314 detects the variation of the position of the main object in the images captured by the image capturing apparatus 20 successively as an angle (S1410). Then, the image capturing direction variation acquiring module 300 acquires the variation of the image capturing direction of the image capturing apparatus 20 (S1420). Then, the position variation adjusting module 316 adjusts the amount of variation of the position of the main image detected by the position variation detecting module 314 on the basis of the amount of variation of the image capturing direction acquired by the image capturing direction variation acquiring module 300 (S1430).

Then, the result acquiring module 318 acquires the moving direction of the main object in a three-dimensional space on the basis of the size of the main object detected by the size variation detecting module 312 and the variation of the position of the main object adjusted by the position variation adjusting module 316 (S1440). The moving direction image adjusting module 320 adjusts the image of the main object captured by the image capturing apparatus 20 on the basis of the moving direction of the main object acquired by the moving direction acquiring module 310 (S1450). Then, the inclination measuring module 330 measures the vertical inclination of the image capturing module 100 (S1460). Then the vertical direction image adjusting module 340 adjusts the image of the main object on the basis of the inclination measured by the inclination measuring module 330 (S1470).

Then, the name searching module 32 extracts the feature from the image of the main object adjusted on the basis of the moving direction of the main object and the vertical inclination of the image capturing module 100, and searches for the name of the main object in the image database 38 by using the extracted feature (S1480). Then, the name searching module 32 provides the user with the search result received from the image database 38 by displaying it on the display module 50.

According to the digital pictorial book system 10 of the present embodiment, since the image stored in the image database 38 can be adjusted to an image in the same direction with the image capturing direction, it is possible to obtain a search result with high accuracy on the basis of the moving direction of the main object and the vertical inclination of the image capturing module 100 in case the searching is performed by using the image and the feature extracted by the image.

Further, it is possible to decrease the amount of image information in the image database 38 by storing only image captured in a predetermined direction.

Furthermore, in case the digital pictorial book system 10 is connected to the image database 38 through a network 36, since the image adjustment process is performed by the terminal of the digital pictorial book system 10, it is possible to decrease the load of the image database 38, for a plurality of users to be able to use it simultaneously, and to increase the convenience.

Figure 19:
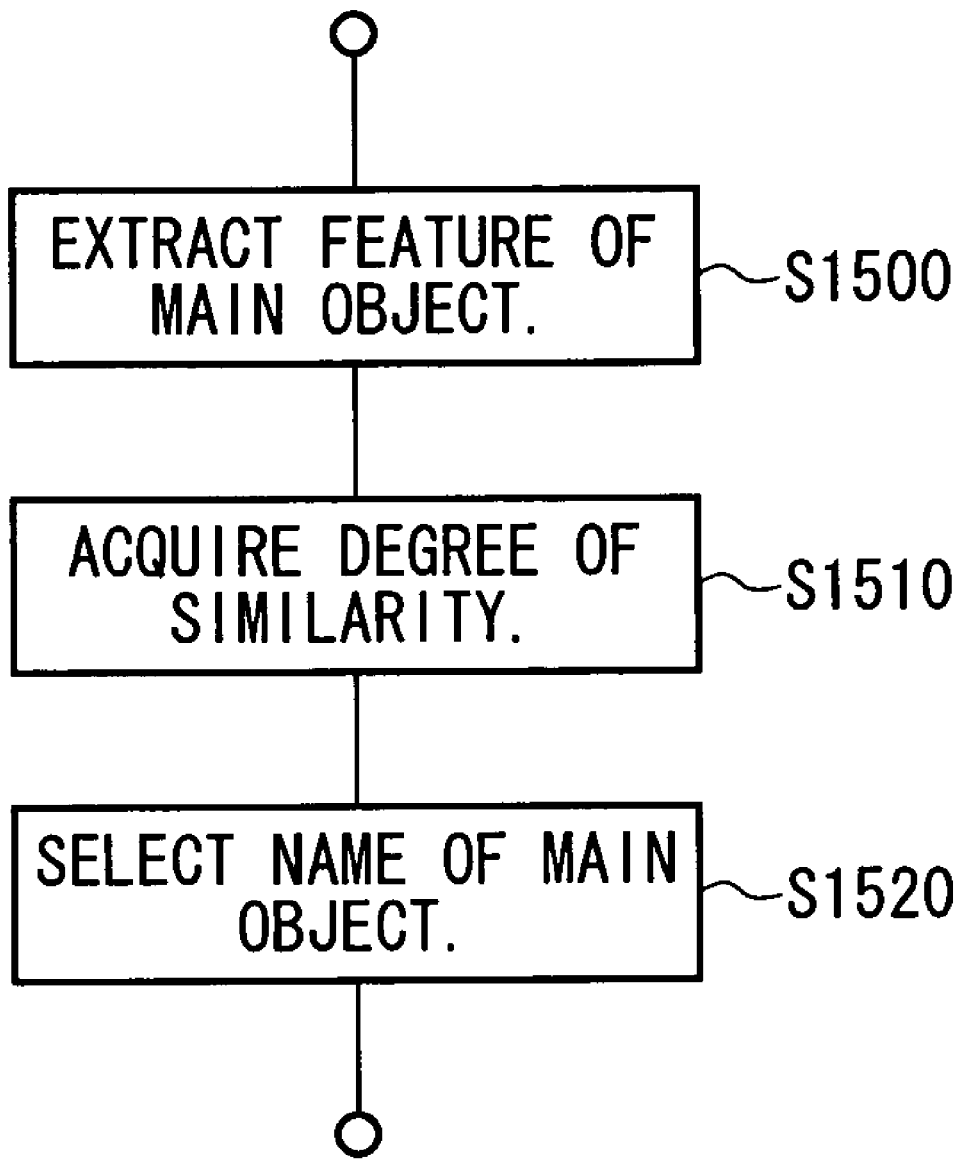
FIG. 19 is a flow chart showing S1480 shown in FIG. 18 in detail.

FIG. 19 is a flow chart showing S1480 shown in FIG. 18 in detail. First, the first feature extracting module 500 extracts the feature of the main object from the image adjusted by the vertical direction image adjusting module 340 (S1500). Then, the degree of similarity acquiring module 550 acquires the degree of similarity between the main object and each of the plurality of objects of which names are stored in the image database 38 on the basis of the feature of the main object received by the first feature extracting module 500 (S1510).

Then, the name selecting module 560 selects the name of the main object out of the names of the plurality of objects on the basis of the similarity between the main object and the object acquired by the degree of similarity acquiring module 550 for each of the objects of which names are stored in the image database 38 (S1520). Then, the name selecting module 560 displays the selected name on the display module 50 in the step of S1490 shown in FIG. 18. Here, the digital pictorial book system 10 may let the user select any one or more of the displayed names in case a plurality of names are selected by the name selecting module 560, retrieve image and information on detailed explanation of the object corresponded to the selected name, and display them on the display module 50.

Further, the name selecting module 560 may inform the user that no name is searched out for the main object by displaying that on the display module 50 in case the degree of similarity acquired by the degree of similarity acquiring module 550 is lower than a reference value predetermined by, for example, the user, etc. for all of the plurality of object of which names are stored in the image database 38.

As for the image capturing angle, there may be a case where an image including a featured part of the main object can not be captured or an object similar to the main object can not be searched out in the image database 38 with enough accuracy. According to the digital pictorial book system 10, however, it is possible to let the user recognize that, for example, a new image must be captured at a different angle by informing the user of not being able to search and capture the new image which can cause successful searching of the name of the main object with high probability even in the above described case. Further, according to this drawing, the name searching module 32 searches for the name of the main object on the basis of the feature of the main object only, but it is also possible to search for the explanation of the main object on the basis of the object other than the main object, the annexed information annexed to the image captured or the movement of the main object, as described with reference to FIGS. 13 to 17.

FIG. 20 shows an example of the image database 38 according to a modification of the present embodiment. According to the digital pictorial book system 10 of the modified embodiment of the present embodiment, the image database 38 shown in FIG. 14 can be especially useful in case of searching for the name of the main object with the image captured by the image capturing apparatus 20 and the moving direction of the main object in the image acquired by the image adjusting module 30 or the vertical inclination of the image capturing module 100 sent to the image database 38 by the name searching module 32 not with the image adjusted by the image adjusting module 30.

The image data base 38 of the present embodiment stores the image of the object as three-dimensional information for each of the plurality of object. Here, the three-dimensional image module information which can generate a projected image of the object in a random direction, such as model data like a polygon, texture data which can be mapped to the model data, etc. Further, the image database 38 stores a vector 422 showing a moving direction of the object in the same coordinate system with that of the three-dimensional information in addition to the three-dimensional information 420 of the image of the object for each of the plurality of objects.

The name searching module 32 searches for the name of the main object in the image database 38 by using a projected image of the object generated on the basis of the vector 422 showing the moving direction and the three-dimensional information 420 by the image database 38 and projected on a surface perpendicular to the image capturing direction. Specifically, the name searching module 32 sends to the image database 38 the information showing the feature like a binary image extracted from the image captured by the image capturing module 100 the vector of the moving direction of the main object in the image acquired by the moving direction acquiring module 310. This vector is preferable to have clear relationship with the image capturing direction, for example, the vector is in a coordinate system having an origin of the center of the lens of the image capturing module 100, aZ-direction in the direction of the optical axis, an X-direction parallel to a plane orthogonal to the Z-direction and a Y-direction perpendicular to both Z and X-direction. Then, the image database 38 generates the projected image by rotating the coordinate axes of the model data for making the received vector of the moving direction be the same with the vector of the moving direction stored and corresponded to the object and projecting the model data on a surface perpendicular to the image capturing direction. Then, the image database 38 compares the feature of the binary image, etc. extracted from the projected image generated with the feature received from the name searching module 32, and determines whether or not the object can be the search result on the basis of the comparison result. Further, the image database 38 may generate the projected image by rotating the coordinate axes further with the vertical inclination received from the name searching module 32, in other words, by using the vertical inclination as the image capturing direction for the main object.

According to the digital pictorial book system 10 of the present invention, it is possible to obtain a search result with high accuracy since it is possible to perform the searching by using the image viewed in the same direction with the image capturing direction of the image capturing module 100 by generating and comparing the projected image in a random direction with the image database 38 storing the three-dimensional information 420. Further, in case the digital pictorial book system 10 is connected to the image database 38 through the network 36, it is possible to decrease the manufacturing cost of the digital pictorial book system 10 since it is possible to decrease the image processing load of the terminal of the digital pictorial book system 10.

Figure 21:
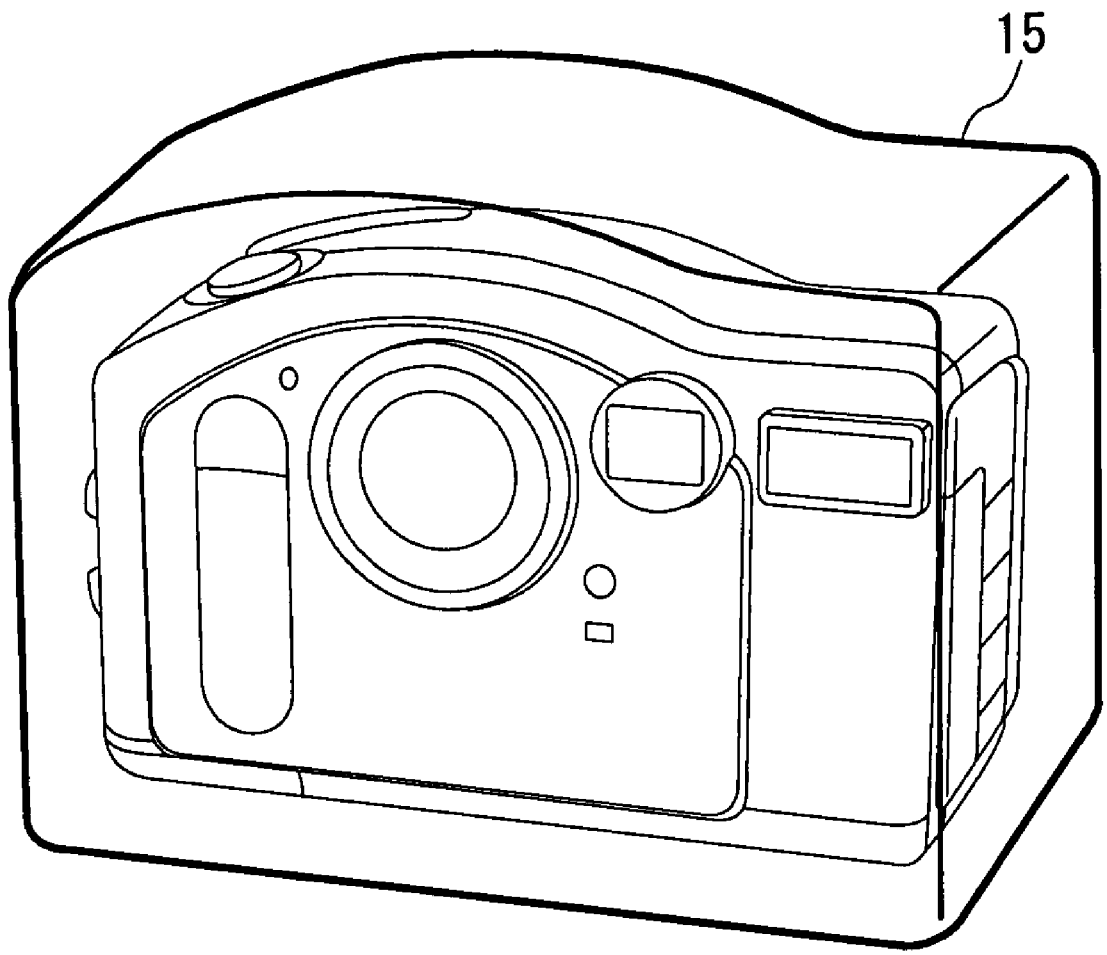
FIG. 21 shows an example of the exterior of the digital pictorial book system 10 according to the present embodiment.

FIG. 21 shows an example of the exterior of the digital pictorial book system 10 according to the present embodiment. The digital pictorial book system according to the present embodiment includes a pressure-resistant and water-proof case 15 which can protect the image capturing module 100 from the high pressure and/or water penetration when in like diving. Due to this, the user can know the kind of animals or fishes found during diving while still in the water, which increases the convenience.

Figure 22:
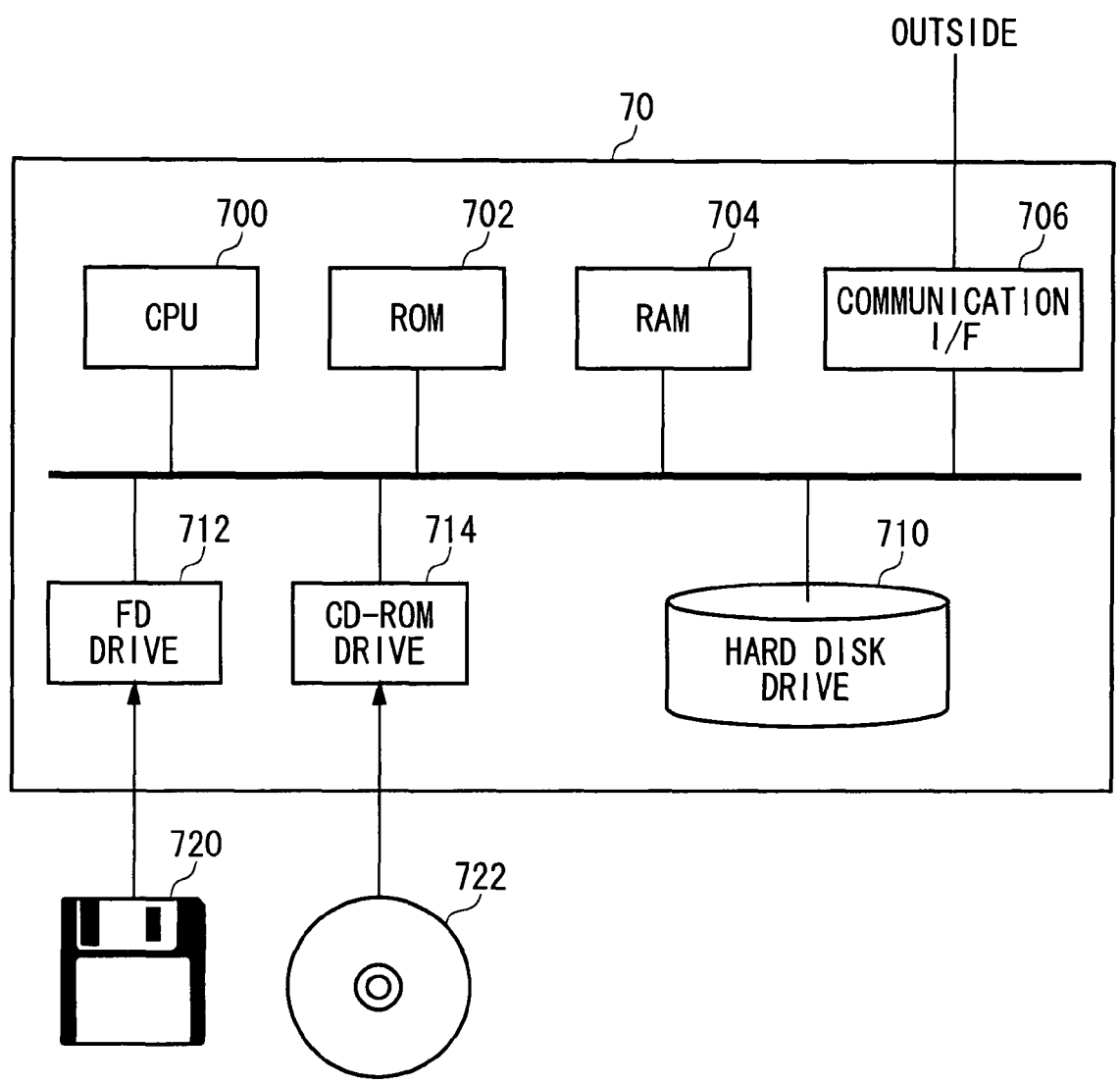
FIG. 22 is a block diagram exemplary showing a hardware configuration of a personal computer 70 performing a function as the digital pictorial book system 10 according to the present embodiment.

FIG. 22 is a block diagram to show an example of the hardware configuration of a personal computer 70 performing a function as the digital pictorial book system 10 according to the present embodiment. The personal computer 70 includes a CPU 700, a ROM 702, a RAM 704, a communication interface 706, a hard disk drive 710, a flexible disk drive 712, and a CD-ROM drive 714. The CPU 700 operates based on programs stored in the ROM 702 and the RAM 704 and controls each part of the personal computer 70.

The flexible disk drive 712 retrieves data or a program from a flexible disk 720 and stores them in the RAM 704. The CD-ROM drive 714 retrieves data or a program from a CD-ROM 722 and stores them in the RAM 704.

A program is stored on a recording medium such as the flexible disk 720 or the CD-ROM 722 and provided to the digital pictorial book system 10 by the user. The program stored in the recording medium may be compressed or not. The program is retrieved from the recording medium, installed in the digital pictorial book system 10, and executed in the digital pictorial book system 10. The program, which is provided by the recording medium and installed in the digital pictorial book system 10, executes the functions of the digital pictorial book system 10 described with regard to the FIGS. 1 to 21.

It is possible to store a part or all of the processes of the digital pictorial book system 10 according to the embodiment explained in the present application in the flexible disk 720 or the CD-ROM 722 shown in FIG. 22, which is an example of the recording medium. The program may be directly retrieved from the recording medium and executed by the digital pictorial book system 10, or may be executed after being installed in the digital pictorial book system 10. Further, the program may be stored in one or a plurality of recording medium(s). Furthermore, the program may be stored in an encoded form.

An optical recoding medium such as DVD, PD, etc., a magneto-optical recording medium such as MD, a tape medium, a magnetic recoding medium, a semiconductor memory such as an IC card, and a miniature card can be used as a recoding medium in addition to the flexible disk and the CD-ROM. Further, a storing apparatus such as a hard disk or a RAM provided in a server system connected with a dedicated communication network and the internet may be used as the recording medium and provide the digital pictorial book system with the program through a communication network.

According to the present invention, it is possible to search for a name of an object accurately even in case of capturing images of the object from various directions.

Although the present invention has been described by way of exemplary embodiments, it should be understood that those skilled in the art might make many modifications and substitutions without departing from the spirit and the scope of the present invention which is defined only by the appended claims.

What is claimed is:

1. A digital pictorial book system comprising:
   an image capturing module for capturing an image;
   a CPU operating to provide:
   a main object selecting module for selecting a main object out of the image;
   an inclination measuring module for measuring inclination of said image capturing module in a vertical direction;
   a name searching module for searching for a name of the main object in an image database, which stores a name of an object corresponded to a feature of the object, on the basis of the main object selected by said main object selecting module and the inclination measured by said inclination measuring module;
   a vertical direction image adjusting module for adjusting the image of the main object to be an image captured in a horizontal direction by using the inclination measured by said inclination measuring module;
   a first feature extracting module for extracting a feature of the main object from the image adjusted by said vertical direction adjusting module;
   a degree of similarity acquiring module for acquiring degree of similarity between the main object and each of a plurality of objects of which names are stored in the image database by comparing the feature of the main object extracted by said first feature extracting module with that of each of the plurality of objects stored in the image database; and
   a name selecting module for selecting the name of the main object out of names of the plurality of objects on the basis of the acquired degree of similarity of each of the plurality of objects,
   wherein said name searching module searches for the name of the main object by using the image adjusted by said vertical direction image adjusting module.

2. A digital pictorial book system as claimed in claim 1 further comprising a displaying module for the name selected by said name selecting module,
   wherein said name selecting module selects a name or names of a predetermined number of object or objects having the highest degree of similarity or degrees of similarities out of the names of the plurality of objects.

3. A digital pictorial book system as claimed in claim 2, wherein
   said name searching module further comprises an distinguishing feature selecting module for selecting distinguishing feature, which has the least overlap in a certainty distribution of the feature for every name and every kind of feature of the object out of different kinds of features which are stored in the image database and corresponded to each of the plurality of names, in case the name selecting module selects a plurality of names, and
   said displaying module further displays information on the distinguishing feature.

4. A digital pictorial book system as claimed in claim 1, wherein said name selecting module informs a user of impossibility of searching for the name of the main object in case the acquired degree of similarity is lower than a predetermined reference value for each of the plurality of objects.

5. A digital pictorial book system as claimed in claim 1, wherein
   said name searching module further comprises a second feature extracting module for extracting a feature of an object different from that of the main object out of the image adjusted by said vertical direction adjusting module, the image database stores the name of the object further corresponded to a feature of a thing of high relevance to the object, and said degree of similarity acquiring module acquires the degree of similarity between the main object and each of the plurality of objects by further comparing the feature of the thing of high relevance to the object stored in the image database with the feature of the object different from the main object extracted by said second feature extracting module for each of the plurality of objects of which the name is stored in the image database.

6. A digital pictorial book system as claimed in claim 1, wherein said name searching module further comprises an annexed information acquiring module for acquiring information annexed to the image, the image database stores the name of the object further corresponded to the annexed information annexed to the image of the object, and said degree of similarity acquiring module acquires the degree of similarity between the main object and each of the plurality of objects by comparing the annexed information annexed to the image of the object stored in the image database with the annexed information obtained by said annexed information acquiring module for each of the plurality of objects of which the names are stored in the image database.

7. A digital pictorial book system comprising:

an image capturing module for capturing an image;

a CPU operating to provide:

a main object selecting module for selecting a main object out of the image;

an inclination measuring module for measuring inclination of said image capturing module in a vertical direction;

a name searching module for searching for a name of the main object in an image database, which stores a name of an object corresponded to a feature of the object, on the basis of the main object selected by said main object selecting module and the inclination measured by said inclination measuring module;

a vertical direction image adjusting module for adjusting the image of the main object to be an image captured in a horizontal direction by using the inclination measured by said inclination measuring module;

wherein said image capturing module captures a moving picture, the image database stores the name of the object corresponded to a movement information on a movement of the object, said name searching module comprises:

a motion detecting module for detecting a movement of the main object on the basis of each of the main objects of a plurality of frames of the moving picture;

a degree of similarity acquiring module for acquiring a degree of similarity between the main object and each of the plurality of objects by comparing the movement shown by the movement information of the object stored in the image database with that of the main object detected by said motion detecting module for each of the plurality of objects of which names are stored in the image database; and a name selecting module for selecting the name of the main object out of names of the plurality of objects on the basis of the acquired degree of similarity of each of the plurality of objects, wherein said name searching module searches for the name of the main object by using the image adjusted by said vertical direction image adjusting module.

8. A digital pictorial book system as claimed in claim 7, wherein said name searching module further comprises a featuring point detecting module for detecting a featuring point of the main object of each of the plurality of frame images, and said motion detecting module detects the movement of the main object on the basis of a variation in the featuring point detected by said featuring point detecting module for each of the plurality of frame images.

* * * * *